US012570403B2

(12) United States Patent
Rao et al.

(10) Patent No.: US 12,570,403 B2
(45) Date of Patent: Mar. 10, 2026

(54) INTELLIGENT DEPLOYMENT CONTROL OF BREAK OVER SEAT PAN USING TEXTILE PRESSURE MAPPING TECHNIQUE

(71) Applicant: B/E Aerospace, Inc., Winston-Salem, NC (US)

(72) Inventors: Sreekanth Rao, Bangalore (IN); Pradeep Acharya, Bangalore (IN); Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 237 days.

(21) Appl. No.: 18/511,048

(22) Filed: Nov. 16, 2023

(65) Prior Publication Data

US 2025/0066022 A1      Feb. 27, 2025

(30) Foreign Application Priority Data

Aug. 22, 2023    (IN) ............................. 202311056302

(51) Int. Cl.
*B64D 11/06*            (2006.01)
(52) U.S. Cl.
CPC .... *B64D 11/06395* (2014.12); *B64D 11/0643* (2014.12)
(58) Field of Classification Search
CPC ..................... B64D 11/0643; B64D 11/06395
See application file for complete search history.

(56) References Cited

U.S. PATENT DOCUMENTS

| | | | |
|---|---|---|---|
| 4,410,215 | A | 10/1983 | Mckean et al. |
| 4,509,795 | A | 4/1985 | Brennan et al. |
| 6,866,341 | B2 | 3/2005 | Behnert |
| 7,735,922 | B2 | 6/2010 | Frey et al. |
| 8,727,440 | B1 | 5/2014 | Giasson et al. |
| 9,789,964 | B2 | 10/2017 | Garing et al. |
| 10,246,193 | B1 | 4/2019 | Finlay |
| 10,308,363 | B2 | 6/2019 | Ward |
| 10,391,915 | B2 | 8/2019 | Last et al. |
| 10,829,222 | B2 | 11/2020 | De La Garza et al. |
| 10,842,282 | B2 | 11/2020 | Last |
| 10,974,833 | B2 | 4/2021 | Riedel et al. |
| 11,148,812 | B2 | 10/2021 | Last et al. |
| 11,319,075 | B1 | 5/2022 | Malecha et al. |
| 11,396,377 | B1 | 7/2022 | Zurian |
| 11,485,498 | B2 | 11/2022 | Bunea et al. |

(Continued)

OTHER PUBLICATIONS

European Search Report received in EP Application No. 24195433.8, Jan. 15, 2024, 9 pages.

(Continued)

*Primary Examiner* — Anthony D Barfield
(74) *Attorney, Agent, or Firm* — Suiter Swantz IP

(57)            ABSTRACT

A seat pan includes a break over function. The break over enables downward motion of a portion of the seat pan. The downward motion of the portion of the seat pan allows a distance between passenger seats to be reduced while maintaining a minimum required egress distance between the passenger seats. The breakover seat pan assists in egress. The portion of the seat pan may be actuated upwards to increase the length of the seat pan while a passenger is seated. The seat pan thus creates a supported seat surface when an occupant sits on the seat while presenting with a reduced surface when not occupied.

12 Claims, 24 Drawing Sheets

(56)                    References Cited

U.S. PATENT DOCUMENTS

| | | | |
|---|---|---|---|
| 11,498,684 | B2 | 11/2022 | Rao et al. |
| 2007/0200524 | A1 | 8/2007 | Robert et al. |
| 2010/0253129 | A1 | 10/2010 | Dowty et al. |
| 2019/0176990 | A1 | 6/2019 | Rao et al. |
| 2020/0108936 | A1 | 4/2020 | Erb et al. |
| 2020/0130537 | A1 | 4/2020 | Cordes et al. |
| 2022/0048629 | A1 | 2/2022 | Noshari |
| 2022/0242573 | A1 | 8/2022 | Bunea et al. |
| 2023/0008304 | A1 | 1/2023 | Dowty |
| 2023/0021185 | A1 | 1/2023 | Guthrie |
| 2024/0158086 | A1 | 5/2024 | Dowty et al. |

OTHER PUBLICATIONS

Bo Zhou, et al. "Textile Pressure Mapping Sensor for Emotional Touch Detection in Human-Robot Interaction" https://www.mdpi.com/1424-8220/17/11/2585Publication Date: Nov. 9, 2017.
Jose Francisco Saenz-Cogollo et al. "Pressure Mapping Mat for Tele-Home Care Applications" https://www.mdpi.com/1424-8220/16/3/365Publication Date: Mar. 11, 2016.

106

202

218

216

214

216

252

252

204

212,
224

222,
238

220,
236

106

210

210

210

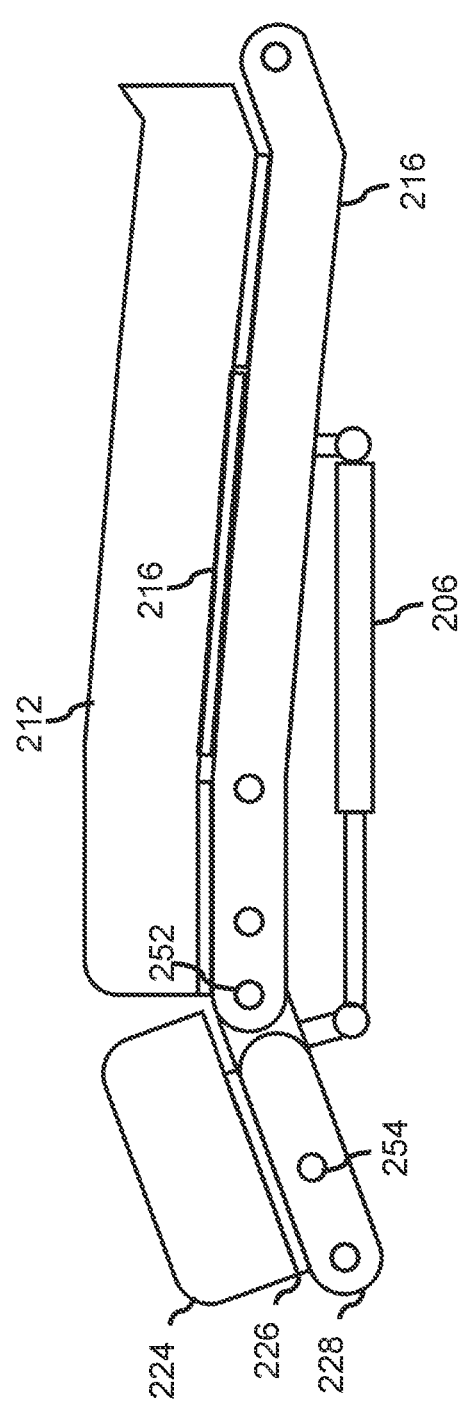
204
212
216
252
224
226
228
216
206
254
FIG. 2N

234

106

INTELLIGENT DEPLOYMENT CONTROL OF BREAK OVER SEAT PAN USING TEXTILE PRESSURE MAPPING TECHNIQUE

CROSS REFERENCE TO RELATED APPLICATION(S)

The present application claims the benefit of India Provisional Patent Application 202311056302, filed Aug. 22, 2023, titled "INTELLIGENT DEPLOYMENT CONTROL OF BREAK OVER SEAT PAN USING TEXTILE PRESSURE MAPPING TECHNIQUE", with a Digital Access Service (DAS) code of 5D1E, which is incorporated herein by reference in the entirety.

TECHNICAL FIELD

The present invention generally relates to seats and more specifically to seats with adjustable-length seat pans.

BACKGROUND

Type III overwing exit egress requirements drive the spacing of seats in aircraft. The most constraining requirements surround the egress path toward the exit. Seats are installed at minimum distance for density but large enough to allow regulatory minimum egress path to the exit. The projected distance between the front most portion of the seat at the exit and the aft most point of the seat forward of the exit must be maintained to ensure egress to the emergency exit. It is desired to place the seats closer together while maintaining the emergency pathway. Therefore, it would be advantageous to provide a device, system, and method that cures the shortcomings described above.

SUMMARY

A seat pan is disclosed. The seat pan includes a fixed assembly. The fixed assembly includes a pair of fixed links. The fixed assembly includes a fixed flex pan. The fixed flex pan extends between and couples the pair of fixed links. The fixed assembly includes a fixed upholstery. The fixed upholstery is disposed above and coupled to the fixed flex pan. The seat pan includes a driven assembly. The driven assembly includes a pair of driven links. The pair of fixed links are coupled to the pair of driven links at a pair of revolute joints. The driven assembly is configured to pivot relative to the fixed assembly about the pair of revolute joints between a stowed position, a deployed position, and a breakover position. The driven assembly includes a driven flex pan. The driven flex pan extends between and couples the pair of driven links. The driven assembly includes a driven upholstery. The driven upholstery is disposed above and coupled to the driven flex pan. The seat pan includes a breakover mechanism. The breakover mechanism is coupled between the driven assembly and the fixed assembly. The breakover mechanism is configured to retain the driven assembly at the stowed position and at the deployed position.

In some embodiments, the breakover mechanism includes a plate. The plate is coupled to the fixed link. The breakover mechanism includes a cover. The cover is coupled to the plate. The plate and the cover are configured to receive a first driven link of the pair of driven links when the driven assembly is in the stowed position. The breakover mechanism includes a lock rod. A fore end of the lock rod is coupled to the first driven link by an additional revolute joint. The pair of revolute joints and the additional revolute joint share a common axis of rotation. The plate and the cover define a cam. An aft end of the lock rod follows the cam.

In some embodiments, the cam and the lock rod define a path of the driven assembly between the stowed position, the deployed position, and the breakover position.

In some embodiments, the breakover mechanism comprises a spring. The spring is coupled between the plate and the cover. The lock rod compresses the spring when the driven assembly is in the stowed position.

In some embodiments, the breakover mechanism comprises a magnet. The magnet is coupled to the plate. The magnet magnetically couples to the first driven link when the driven mechanism is in the stowed position.

In some embodiments, the magnet is an electromagnet.

In some embodiments, the seat pan includes a linear actuator. The linear actuator is coupled between the fixed assembly and the driven assembly. The linear actuator is configured to pivot the driven assembly relative to the fixed assembly about the pair of revolute joints between the stowed position, the deployed position, and the breakover position.

In some embodiments, the seat pan includes a controller. The controller is configured to cause the linear actuator to pivot the driven assembly relative to the fixed assembly.

In some embodiments, the fixed upholstery comprises a fixed dress cover and a fixed cushion. The fixed dress cover comprises a pressure mapping sensor. The pressure mapping sensor is configured to generate a pressure map. The controller is configured to receive the pressure map from the pressure mapping sensor. The controller is configured to cause the linear actuator to pivot the driven assembly relative to the fixed assembly based on the pressure map.

In some embodiments, the controller is configured to determine a passenger is sitting on the fixed assembly based on the pressure map. The controller causes the linear actuator to pivot the driven assembly relative to the fixed assembly in response to determining the passenger is sitting on the fixed assembly.

In some embodiments, the fixed assembly comprises a fixed crossbar. The pair of fixed links comprise a fore end and an aft end. The fixed crossbar extends between and couples the pair of fixed links at the fore end of the pair of the fixed links. The aft end of the pair of fixed links includes the pair of revolute joints.

In some embodiments, the driven assembly comprises a driven crossbar. The pair of driven links comprise a fore end and an aft end. The driven crossbar extends between and couples the pair of driven links at the aft end of the pair of the driven links. The fore end of the pair of driven links includes the pair of revolute joints.

A seat group is described. The seat group includes a plurality of passenger seats. Each of the plurality of passenger seats comprise a seat pan. The seat pan comprises a fixed assembly. The fixed assembly includes a pair of fixed links. The fixed assembly includes a fixed flex pan. The fixed flex pan extends between and couples the pair of fixed links. The fixed assembly includes a fixed upholstery. The fixed upholstery is disposed above and coupled to the fixed flex pan. The seat pan includes a driven assembly. The driven assembly includes a pair of driven links. The pair of fixed links are coupled to the pair of driven links at a pair of revolute joints. The driven assembly is configured to pivot relative to the fixed assembly about the pair of revolute joints between a stowed position, a deployed position, and a breakover position. The driven assembly includes a driven flex pan. The driven flex pan extends between and couples the pair of driven links. The driven assembly includes a driven upholstery. The driven upholstery is disposed above and coupled to the driven flex pan. The seat pan includes a breakover mechanism. The breakover mechanism is coupled between the driven assembly and the fixed assembly. The breakover mechanism is configured to retain the driven assembly at the stowed position and at the deployed position.

A seat pan is described. The seat pan includes a fixed assembly. The fixed assembly includes a pair of fixed links. The fixed assembly includes a fixed flex pan. The fixed flex pan extends between and couples the pair of fixed links. The fixed assembly includes a fixed upholstery. The fixed upholstery is disposed above and coupled to the fixed flex pan. The seat pan includes a driven assembly. The driven assembly includes a pair of driven links. The driven assembly includes a driven flex pan. The driven flex pan extends between and couples the pair of driven links. The driven assembly includes a driven upholstery. The driven upholstery is disposed above and coupled to the driven flex pan. The seat pan includes a prismatic joint. The prismatic joint is coupled between the driven assembly and the fixed assembly. The driven assembly is configured to translate relative to the fixed assembly by the prismatic joint.

In some embodiments, the driven upholstery comprises a driven cushion and a driven dress cover. The driven cushion is inflatable.

In some embodiments, the seat pan includes a flexible fabric. The driven upholstery is flush with the fixed upholstery. The flexible fabric is coupled between the fixed upholstery and the driven upholstery.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2I depicts a perspective view of an upholstery with a cover and a cushion, in accordance with one or more embodiments of the present disclosure.

FIG. 2N depicts a side view of a seat pan including an actuator with a breakover mechanism which is hidden, in accordance with one or more embodiments of the present disclosure.

DETAILED DESCRIPTION OF THE INVENTION

Figure 1A:
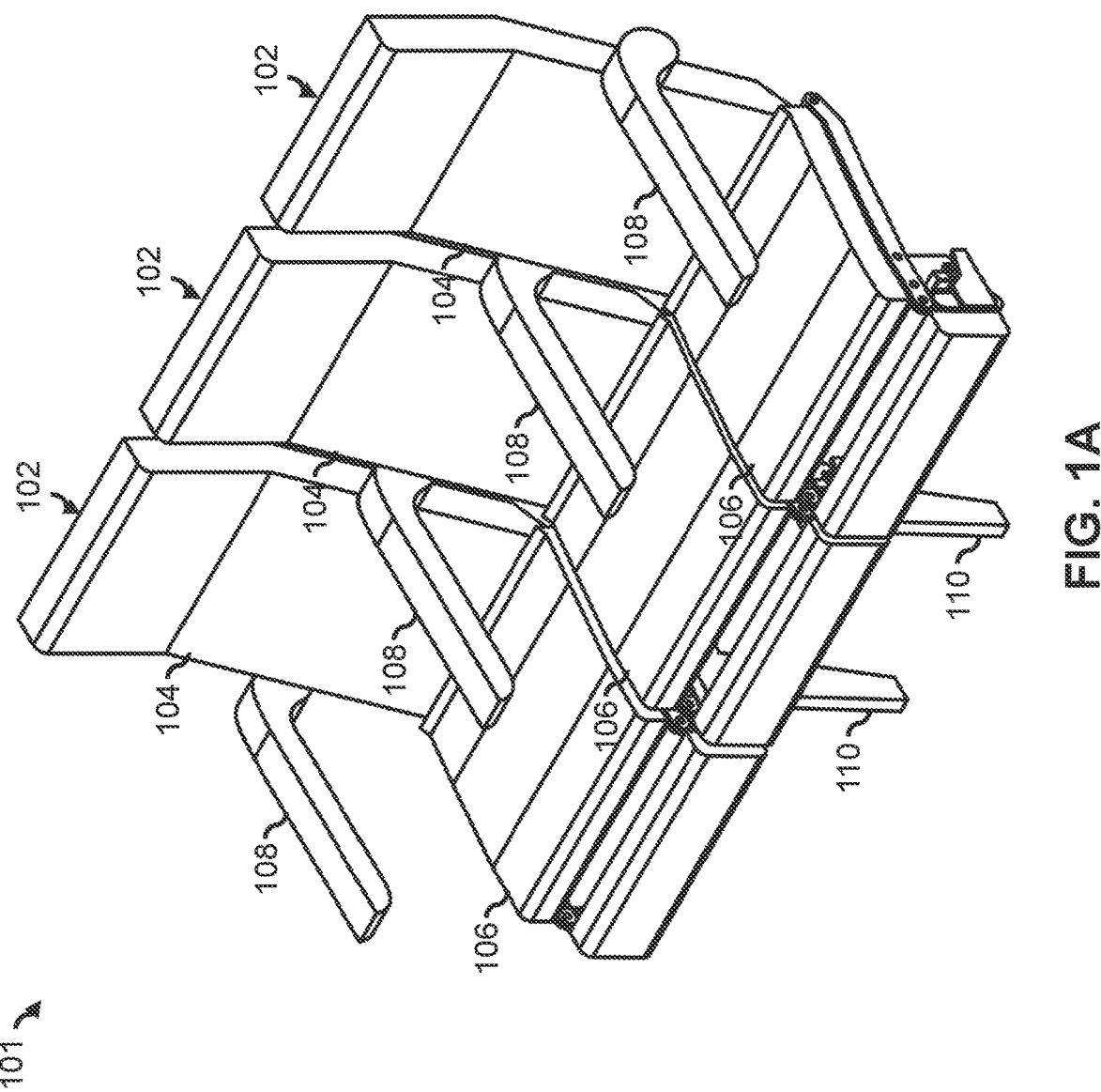
FIGS. 1A-1B depicts a perspective view of an aircraft including a seat group with passenger seats, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a seat pan with a break over function. The break over enables downward motion of a portion of the seat pan. The downward motion of the portion of the seat pan allows a distance between passenger seats to be reduced while maintaining a minimum required egress distance between the passenger seats. The breakover seat pan will assist in egress. The portion of the seat pan may be actuated upwards to increase the length of the seat pan while a passenger is seated. The seat pan thus creates a supported seat surface when an occupant sits on the seat while presenting with a reduced surface when not occupied. The break over is intelligently controlled using a textile pressure mapping technique. Inadvertent deployment of the seat pan can be eliminated by using pressure mapping technique. Thus, the seat pan may be compressed and optimized for lower-weight tight pitch seat assemblies typically used for ultra high-density configurations.

U.S. Pat. No. 10,974,833, titled "Passenger seat entertainment system"; U.S. patent application Ser. No. 18/222,848, titled "System including seat pan assembly"; U.S. Pat. No. 9,789,964, titled "Electronically actuated cable release mechanism for adjustable aircraft passenger seat features and method therefor"; U.S. Patent Publication Number 2007/0200524, titled "Vehicle seat comprising controlled actuator"; U.S. Pat. No. 11,485,498, titled "Aircraft passenger seat leg rest deployment using path and follower mechanism"; U.S. Pat. No. 11,319,075, titled "Compressible cushion for an aircraft seat", filed on Mar. 10, 2021; U.S. Pat. No.

11,396,377, titled "Aircraft seatback cover attachment system"; are incorporated herein by reference in the entirety.

Figure 1B:
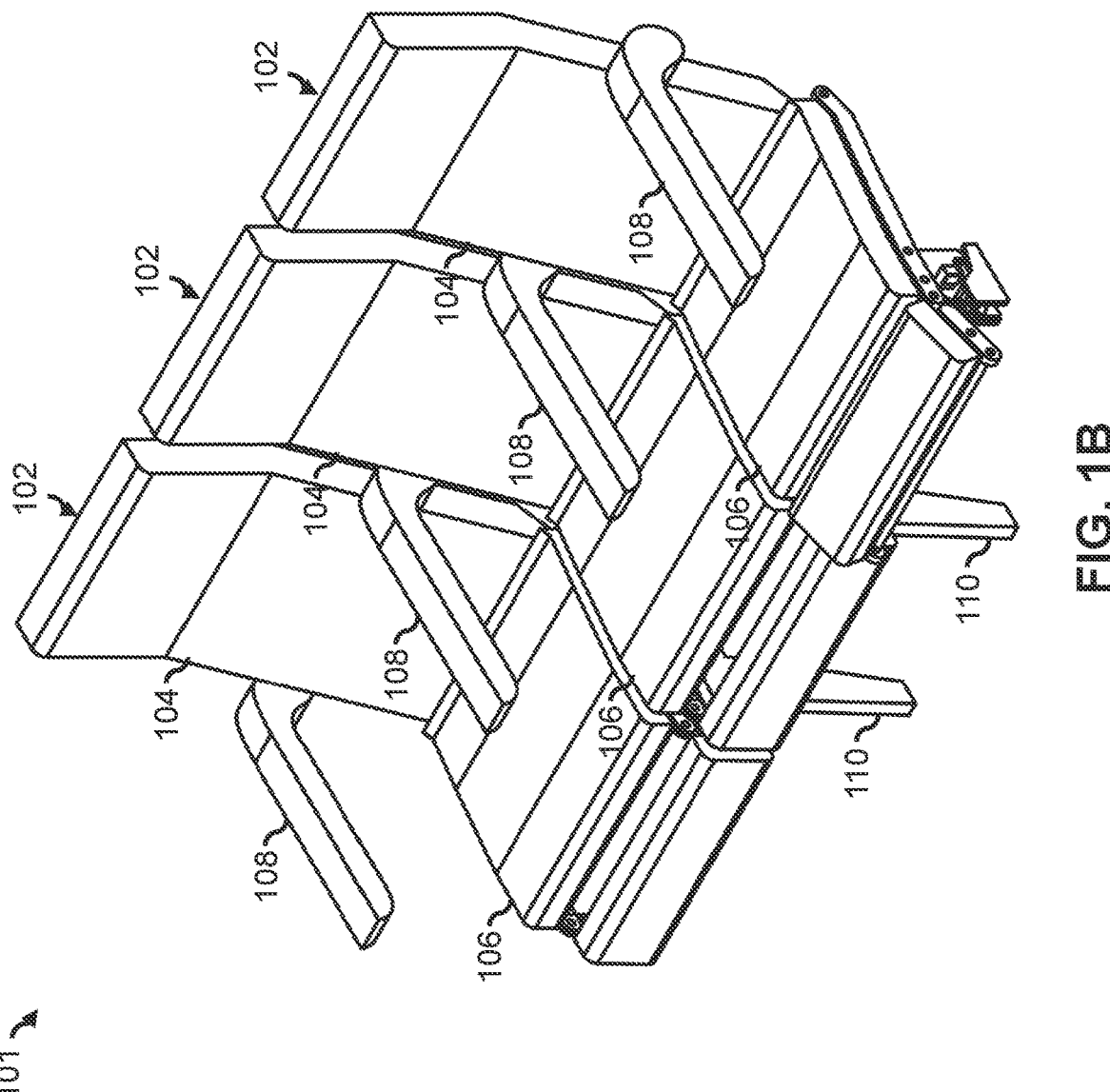

Referring now to FIGS. 1A-1B, an aircraft 100 including a seat group 101, in accordance with one or more embodiments of the present disclosure. The seat group 101 may also be referred to as an over-wing seat group or an exit row seat group. The seat group 101 is mounted to a floor (e.g., a floor-mounted track) of the aircraft 100. The seat group 101 includes one or more passenger seats 102. In some embodiments, the seat group 101 includes between one and four of the passenger seats 102. For example, the seat group 101 is depicted as including three of the passenger seats 102, in a three-abreast configuration. Although the seat group 101 is depicted as a three-abreast configuration, the concepts, techniques, features, and technologies described herein can be extended to any seat group configuration, such as a one-abreast, two-abreast, three-abreast, four-abreast, and the like.

The passenger seat 102 is described, in accordance with one or more embodiments of the present disclosure. The passenger seat 102 may include, but is not limited to, an economy-class passenger seat. The passenger seat 102 includes one or more components, such as, but not limited to, a seat back 104, seat pan 106, armrests 108, legs 110, and the like.

The passenger seat 102 includes the seat pans 106. The seat pans 106 can extend in length and reduce in length. The seat pans 106 are extended in length for comfort when occupied. The seat pans 106 is reduced in length when unoccupied, such as during an emergency evacuation.

The passenger seat 102 includes the legs 110. The legs 110 provide structural support to the seat group 101. The legs 110 are coupled to a floor of the aircraft (e.g., by a track). For example, each of the legs 110 has a lower end coupled to the floor of the aircraft. In some embodiments, the legs 110 provide structural support for multiple of the passenger seats 102 in the seat group 101. In some embodiments, the legs 110 and/or the seat pans 106 of the passenger seats 102 are coupled by one or more cross-tubes (not depicted).

The legs 110 are coupled to the seat pan 106. For example, each of the legs 110 has an upper end coupled to the seat pan 106. In some embodiments, the upper end of the legs are coupled to the seat pan 106 by one or more spreaders. The spreaders may also be referred to as spreader bars.

The passenger seats 102 each include the seat backs 104. The seat backs 104 are coupled to the seat pan 106. The seat back 104 may be configured to pivot relative to the seat pan 106. For example, the seat back 104 can be configured to transition between upright and reclining positions. In some embodiments, the seat back 104 is coupled to the seat pan 106 by one or more revolute joints, or the like.

The passenger seat 102 may also include one or more armrests 108. The armrests 108 may be pivotally mounted to the passenger seat 102 by a revolute joint or another kinematic coupling. The armrests 108 are positioned on opposing sides of the passenger seat 102. One or more of the armrests 108 may be shared with the adjacent seats in the seat group 101.

Figure 2A:
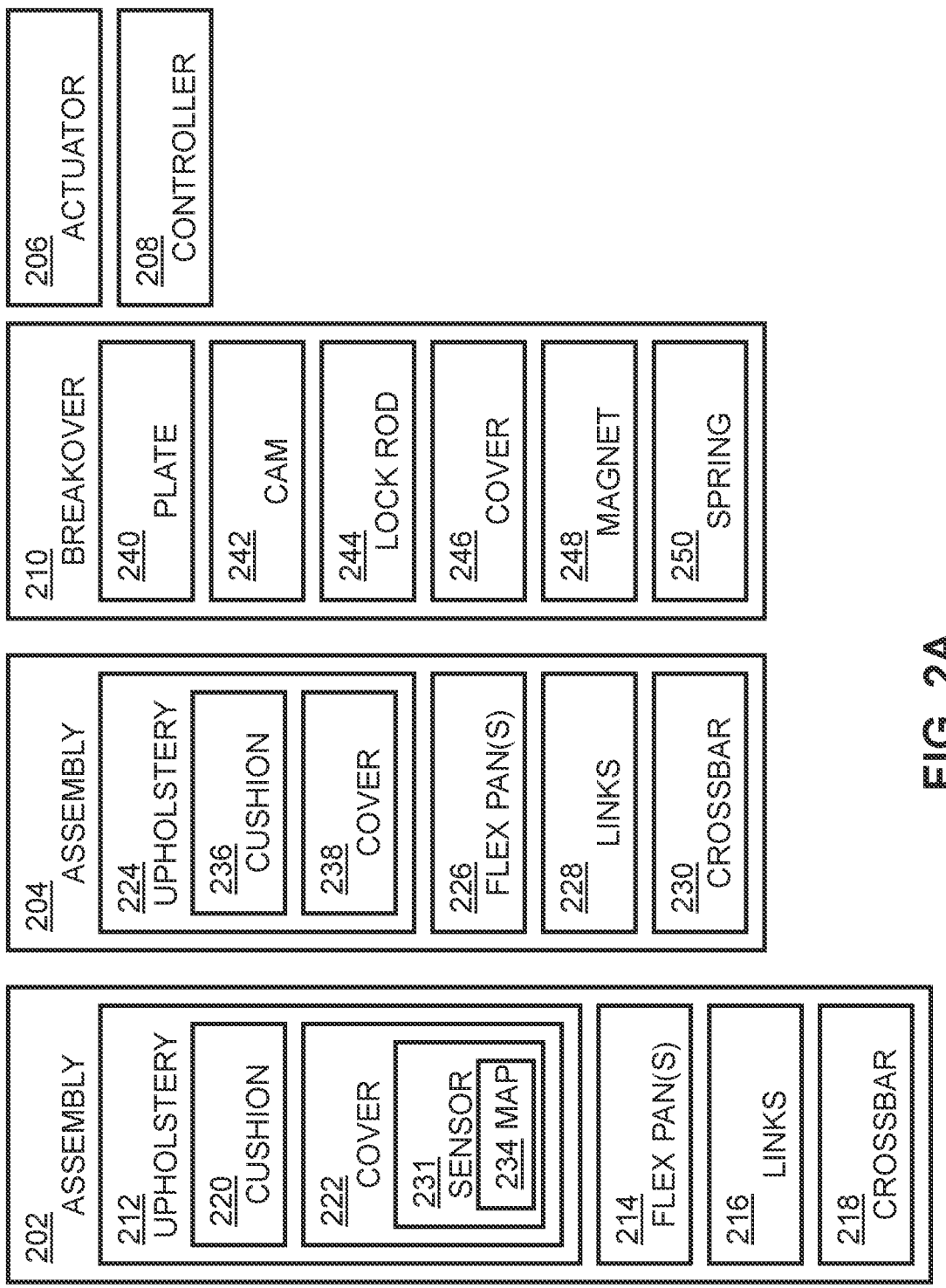
FIG. 2A depicts a simplified block diagram of a seat pan, in accordance with one or more embodiments of the present disclosure.
Figure 2B:
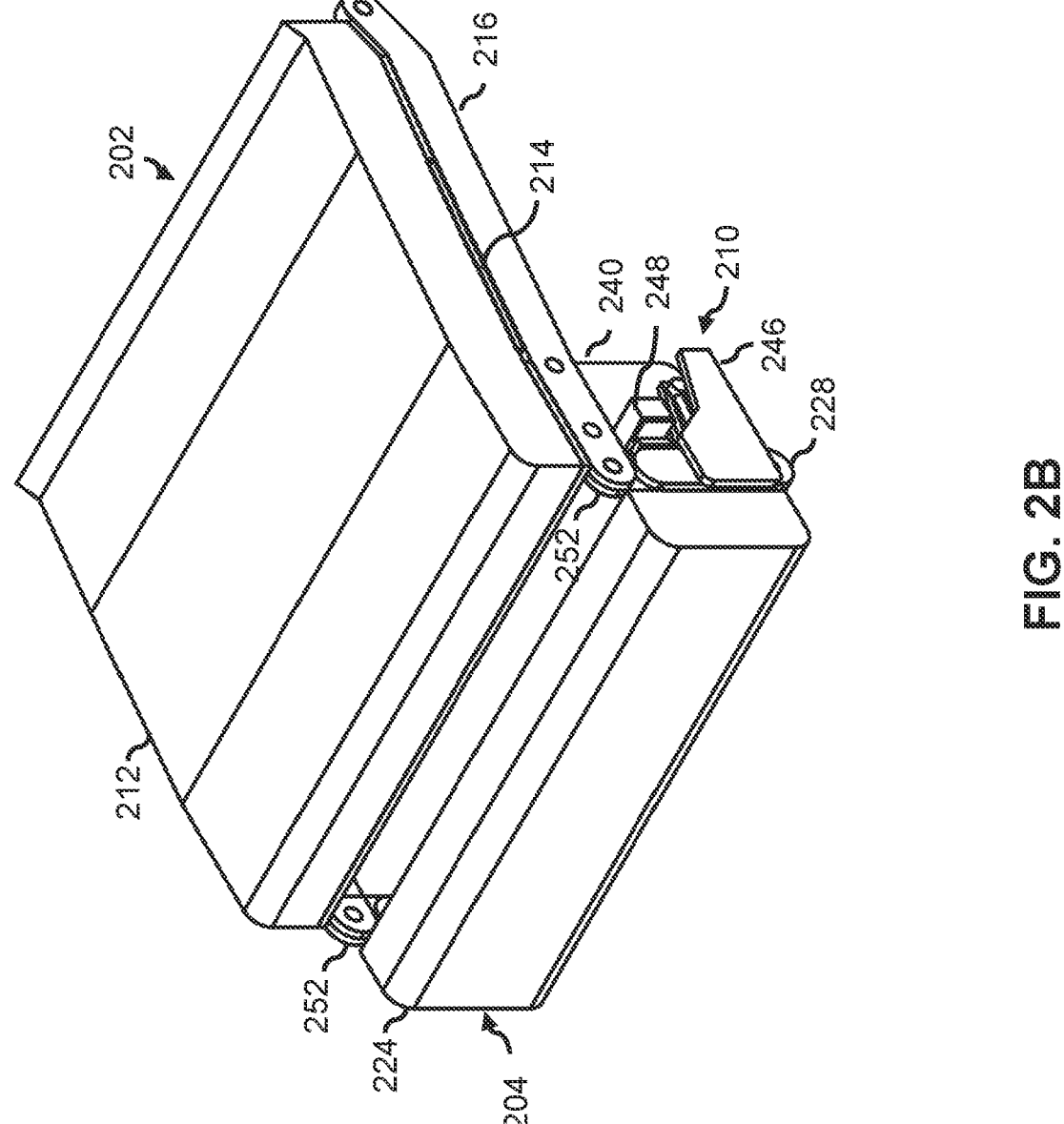
FIG. 2B depicts a perspective view of a seat pan with a driven assembly in a stowed position, in accordance with one or more embodiments of the present disclosure.
Figure 2C:
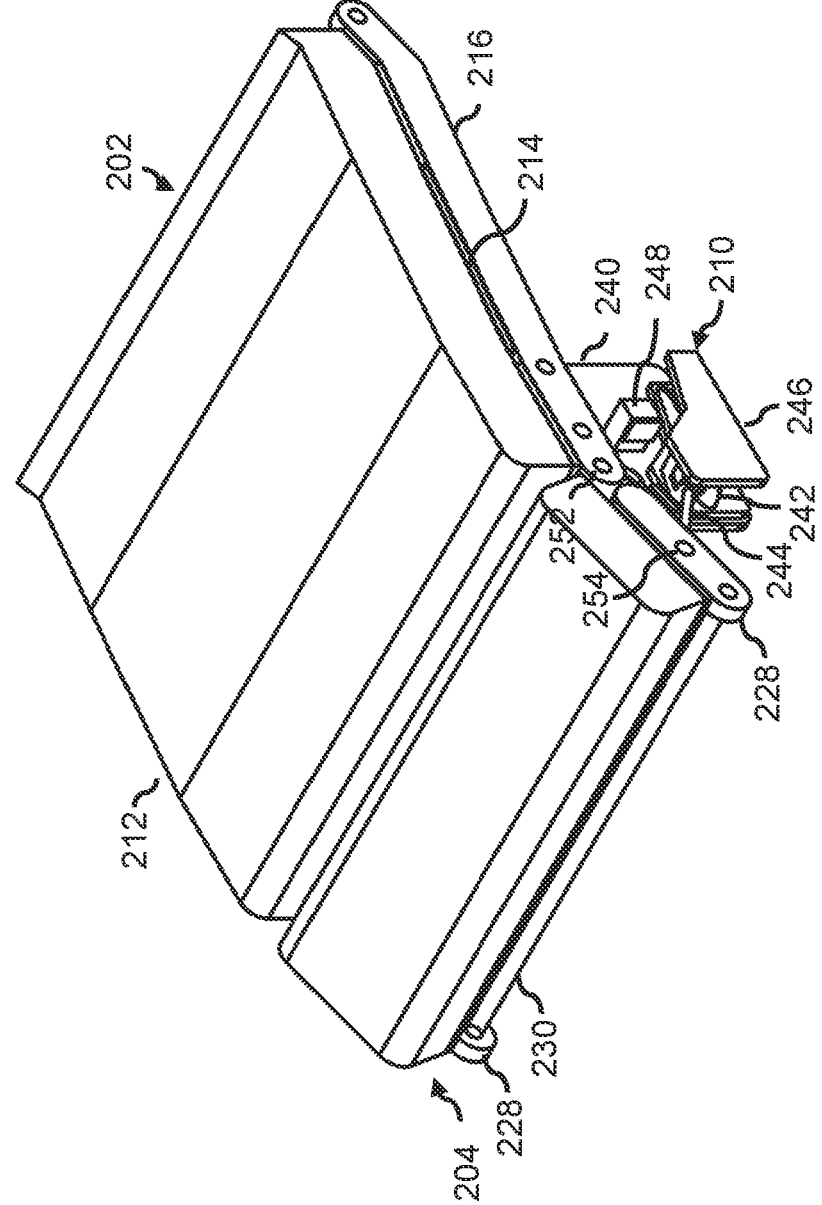
FIG. 2C depicts a perspective view of a seat pan with a driven assembly in a deployed position, in accordance with one or more embodiments of the present disclosure.
Figure 2D:
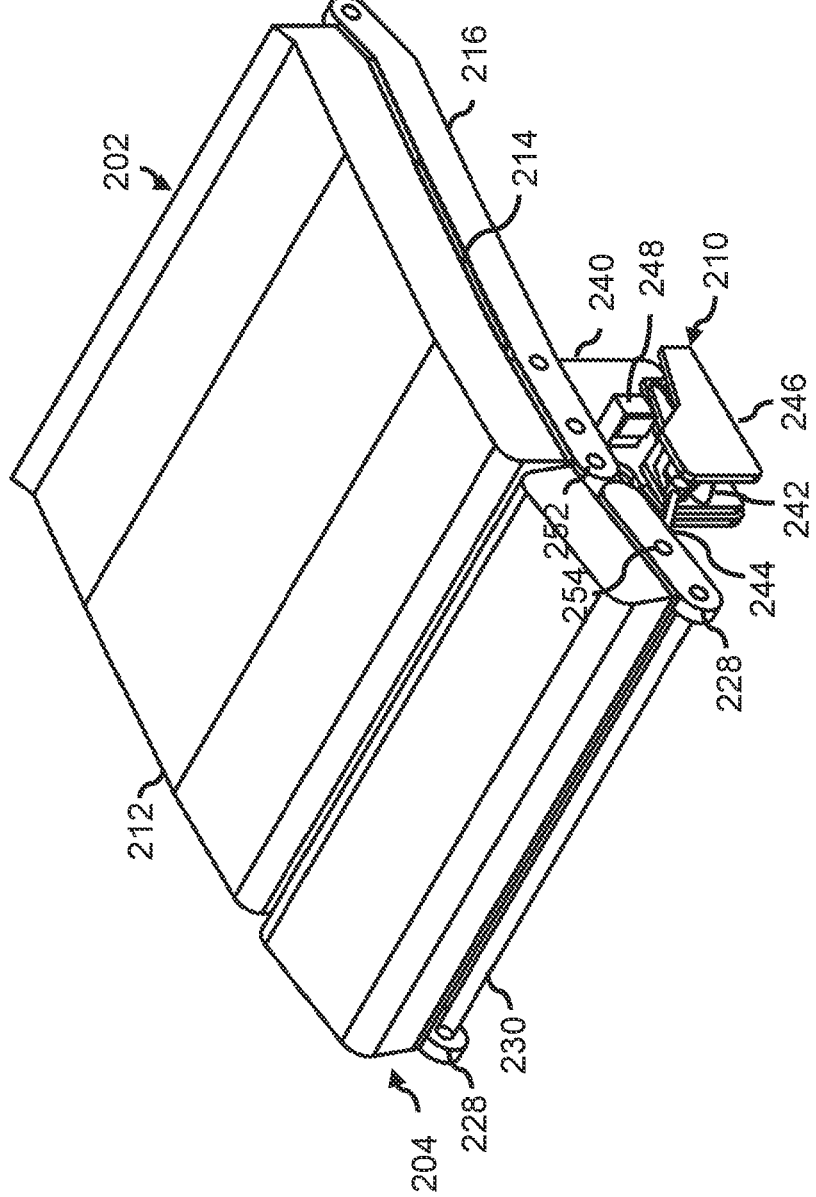
FIG. 2D depicts a perspective view of a seat pan with a driven assembly in a breakover position, in accordance with one or more embodiments of the present disclosure.
Figure 2E:
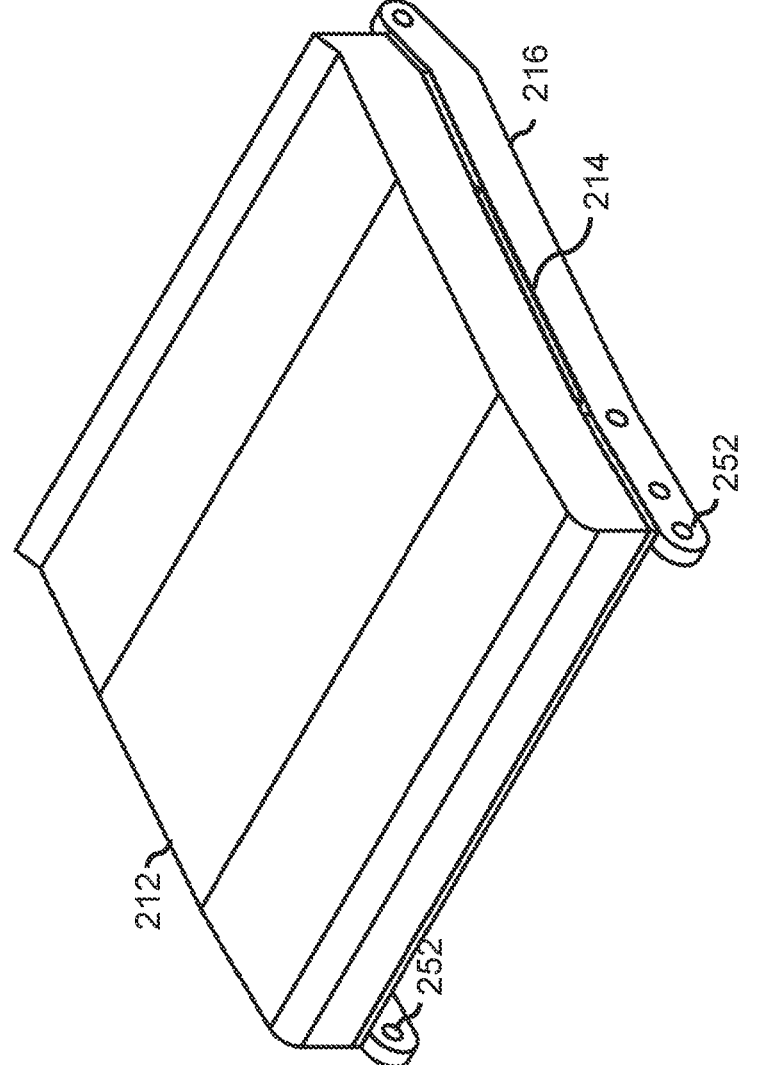
FIG. 2E depicts a perspective view of a fixed assembly of a seat pan, in accordance with one or more embodiments of the present disclosure.
Figure 2F:
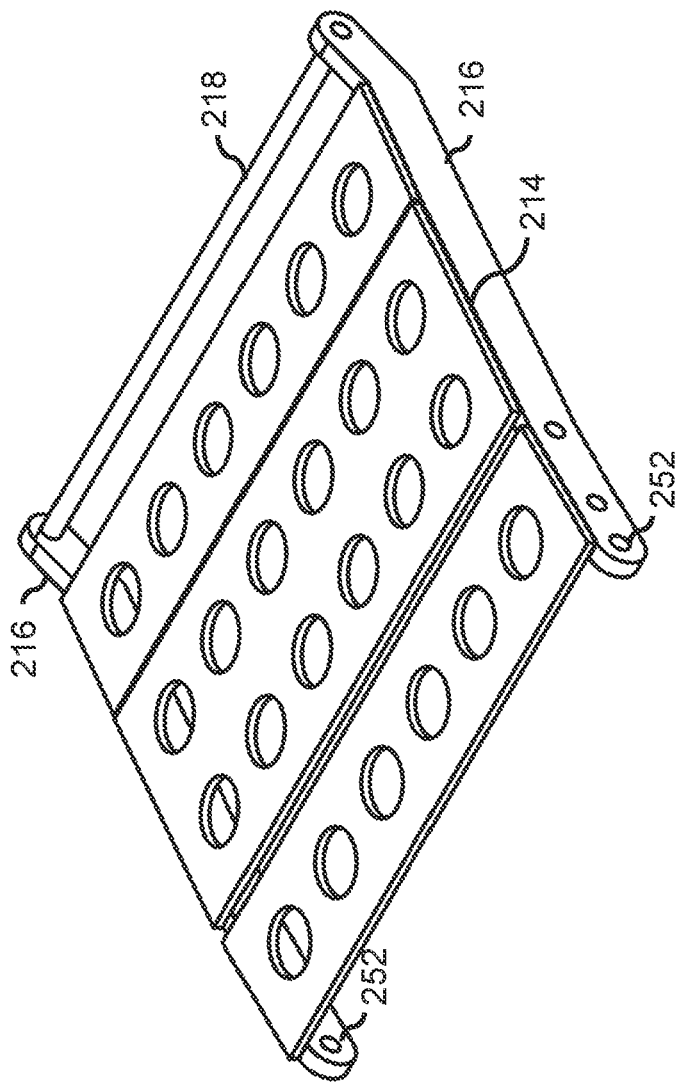
FIG. 2F depicts a perspective view of a fixed assembly of a seat pan with an upholstery which is hidden, in accordance with one or more embodiments of the present disclosure.
Figure 2G:
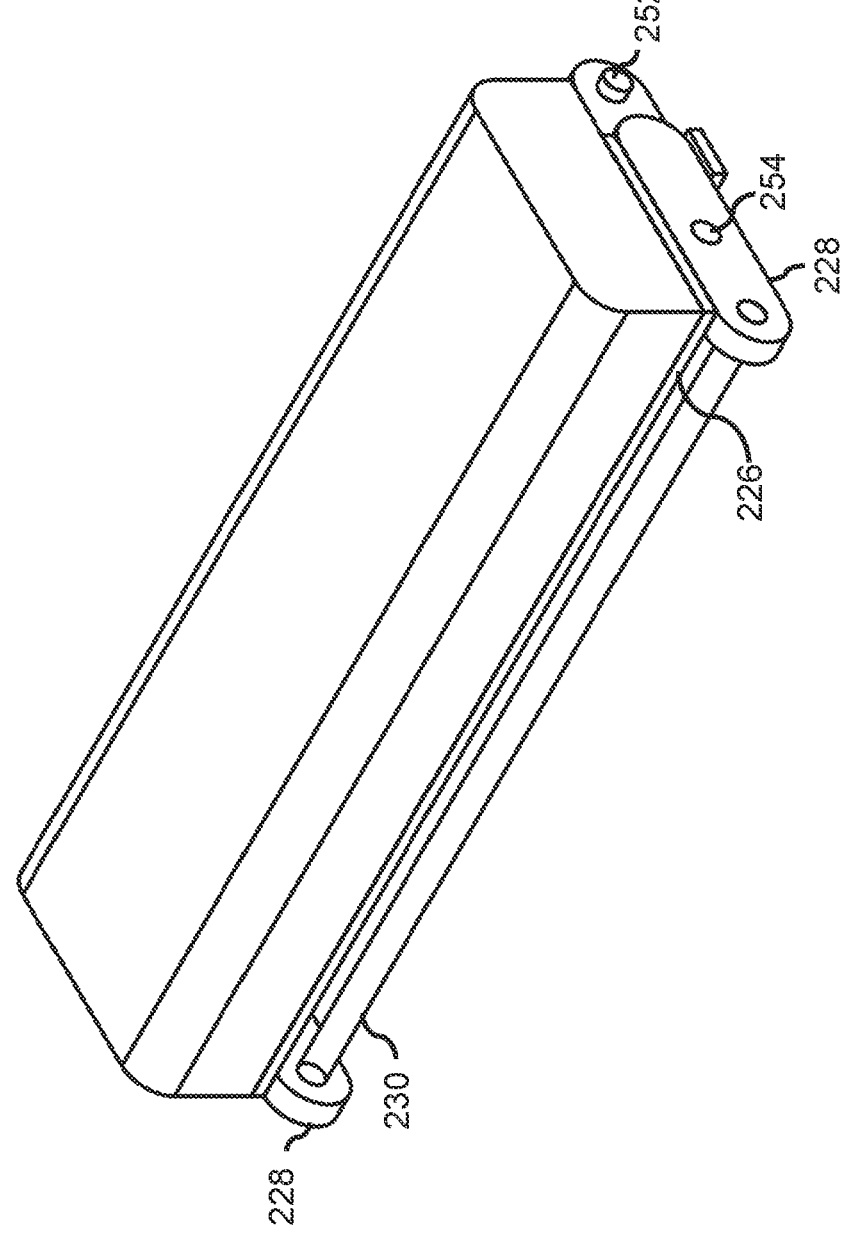
FIG. 2G depicts a perspective view of a driven assembly of a seat pan, in accordance with one or more embodiments of the present disclosure.
Figure 2H:
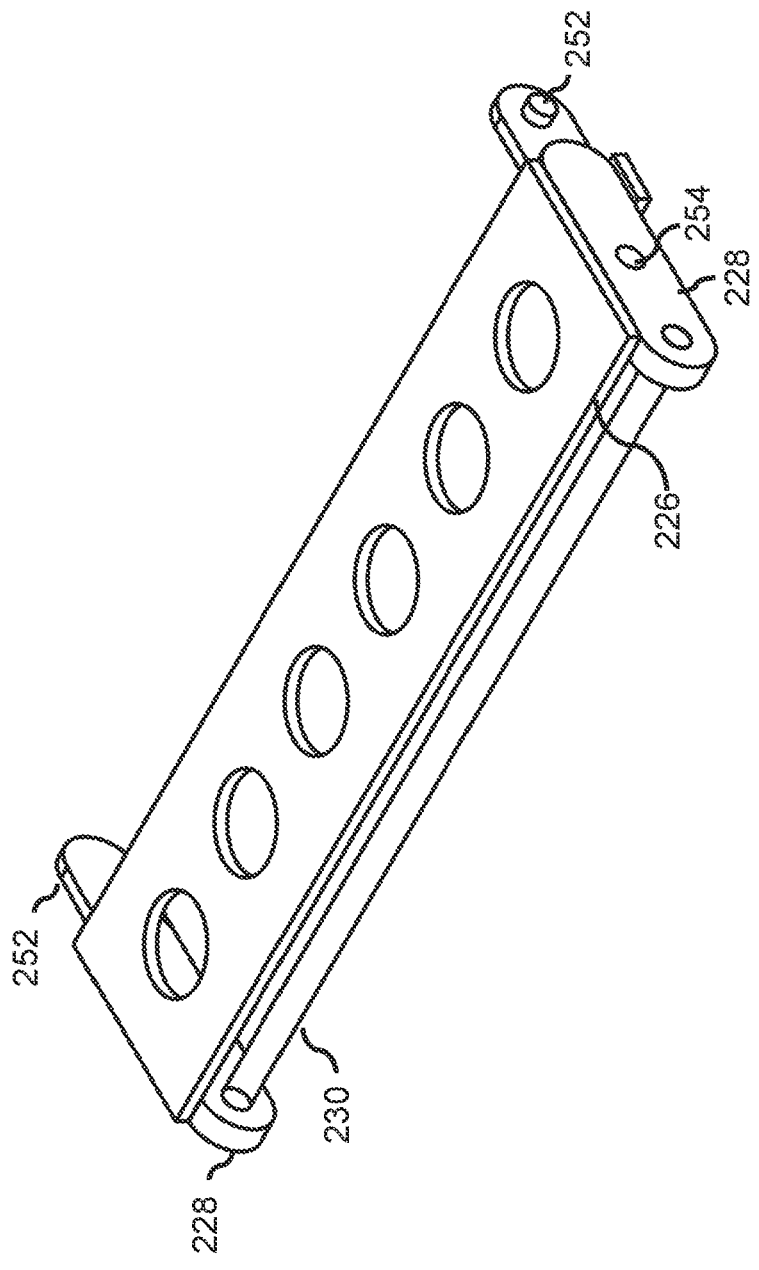
FIG. 2H depicts a perspective view of a driven assembly of a seat pan with an upholstery which is hidden, in accordance with one or more embodiments of the present disclosure.
Figure 21:
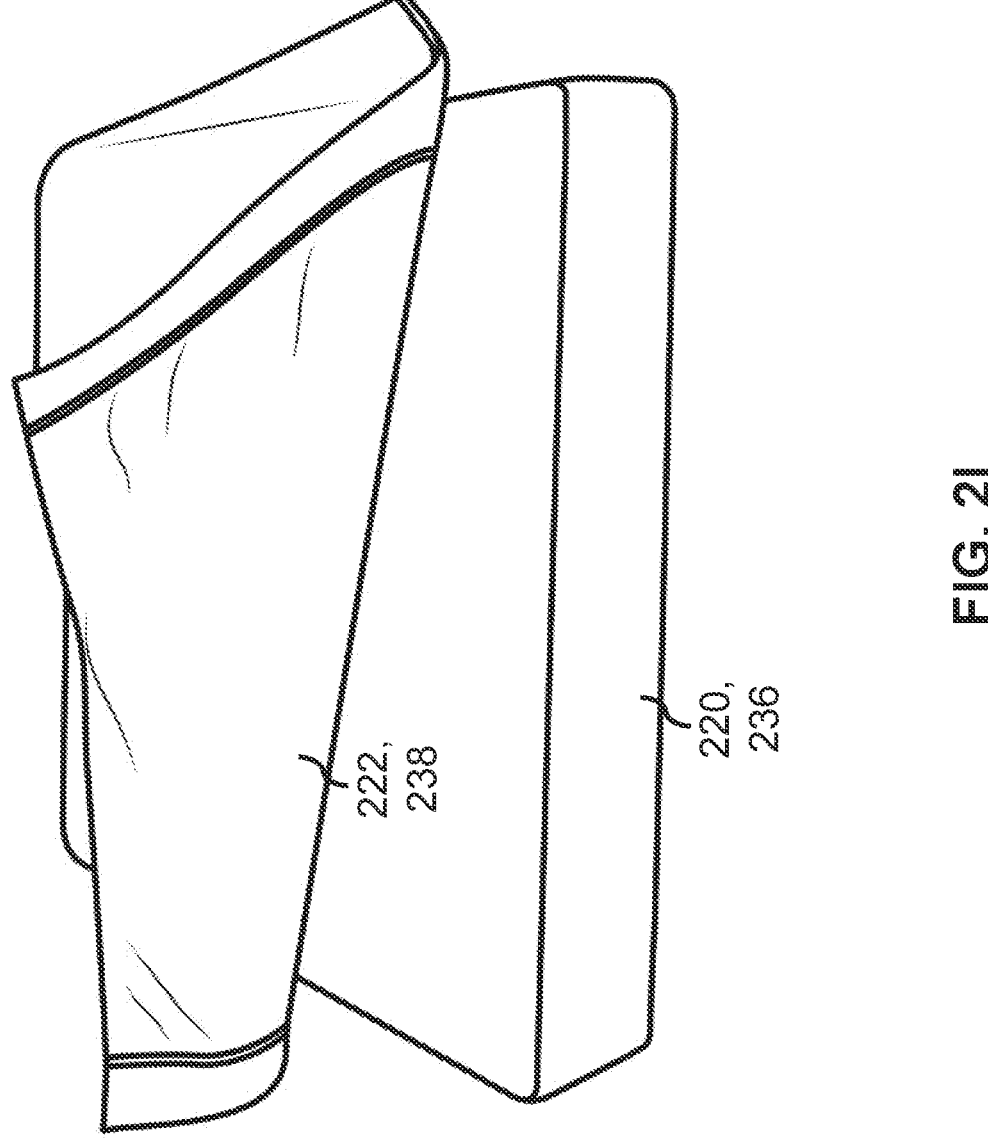
Figure 2J:
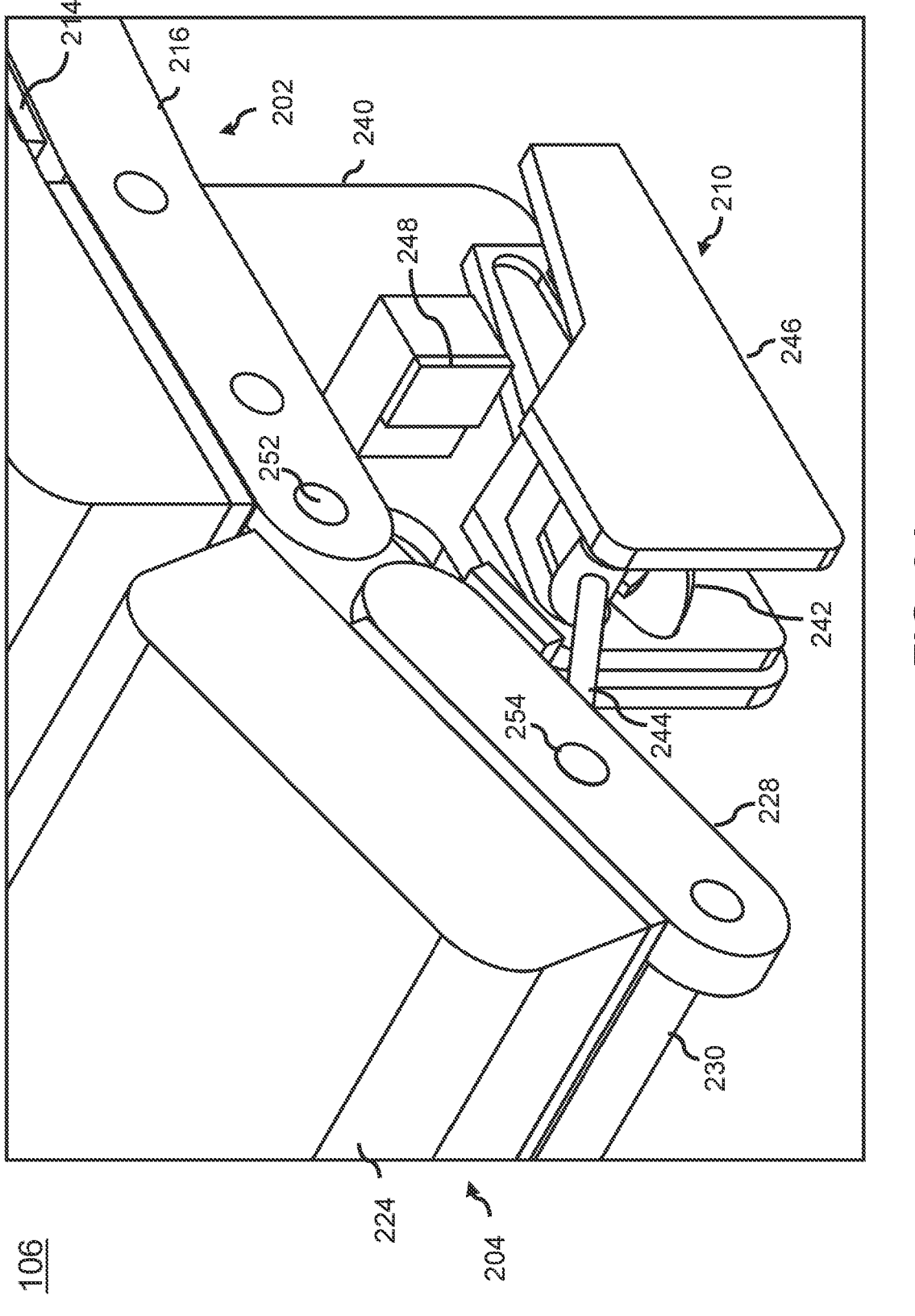
FIG. 2J depicts a partial view of a seat pan, in accordance with one or more embodiments of the present disclosure.
Figure 2K:
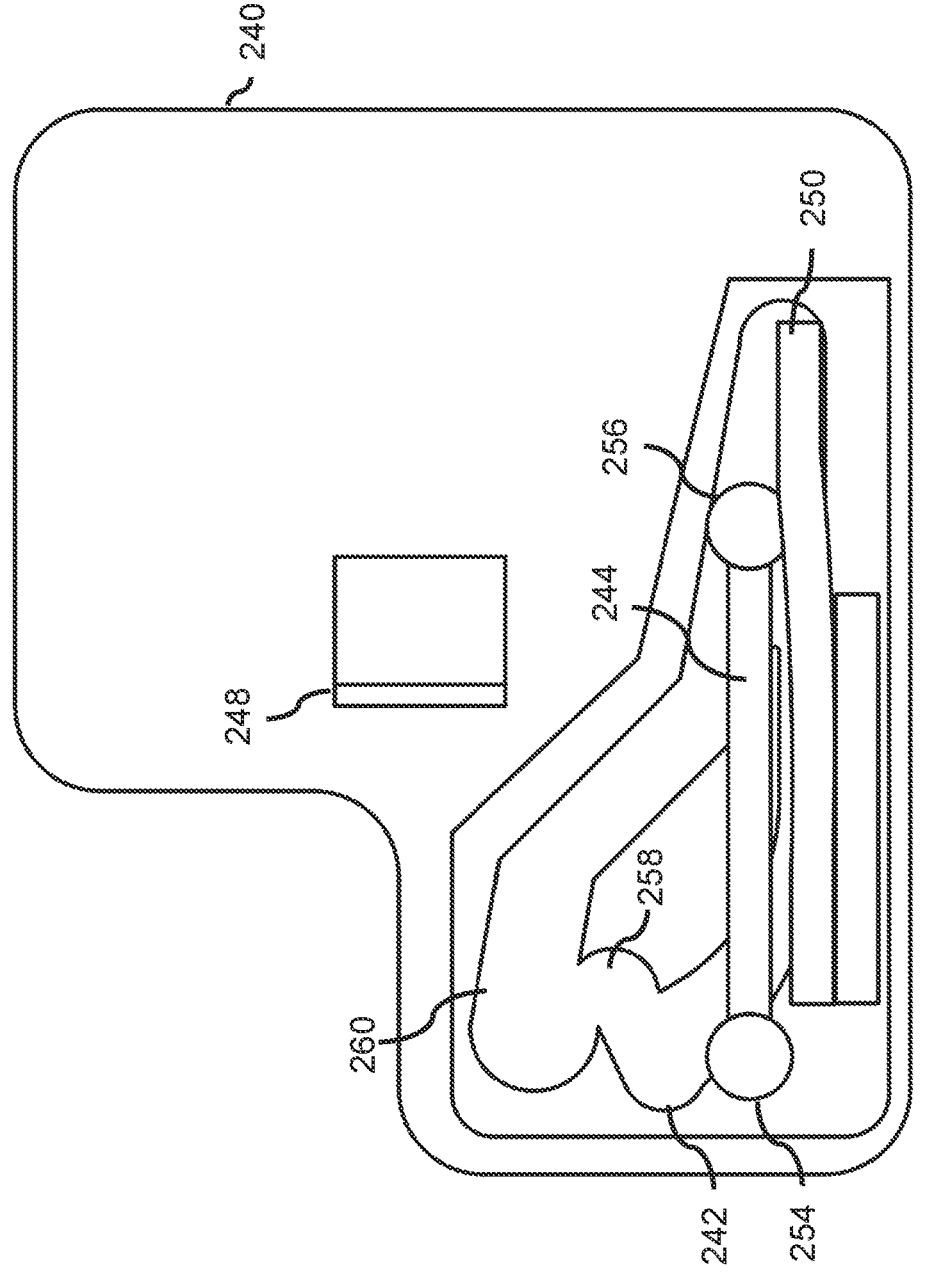
FIG. 2K depicts a partial side view of a breakover mechanism in a stowed position, in accordance with one or more embodiments of the present disclosure.
Figure 2L:
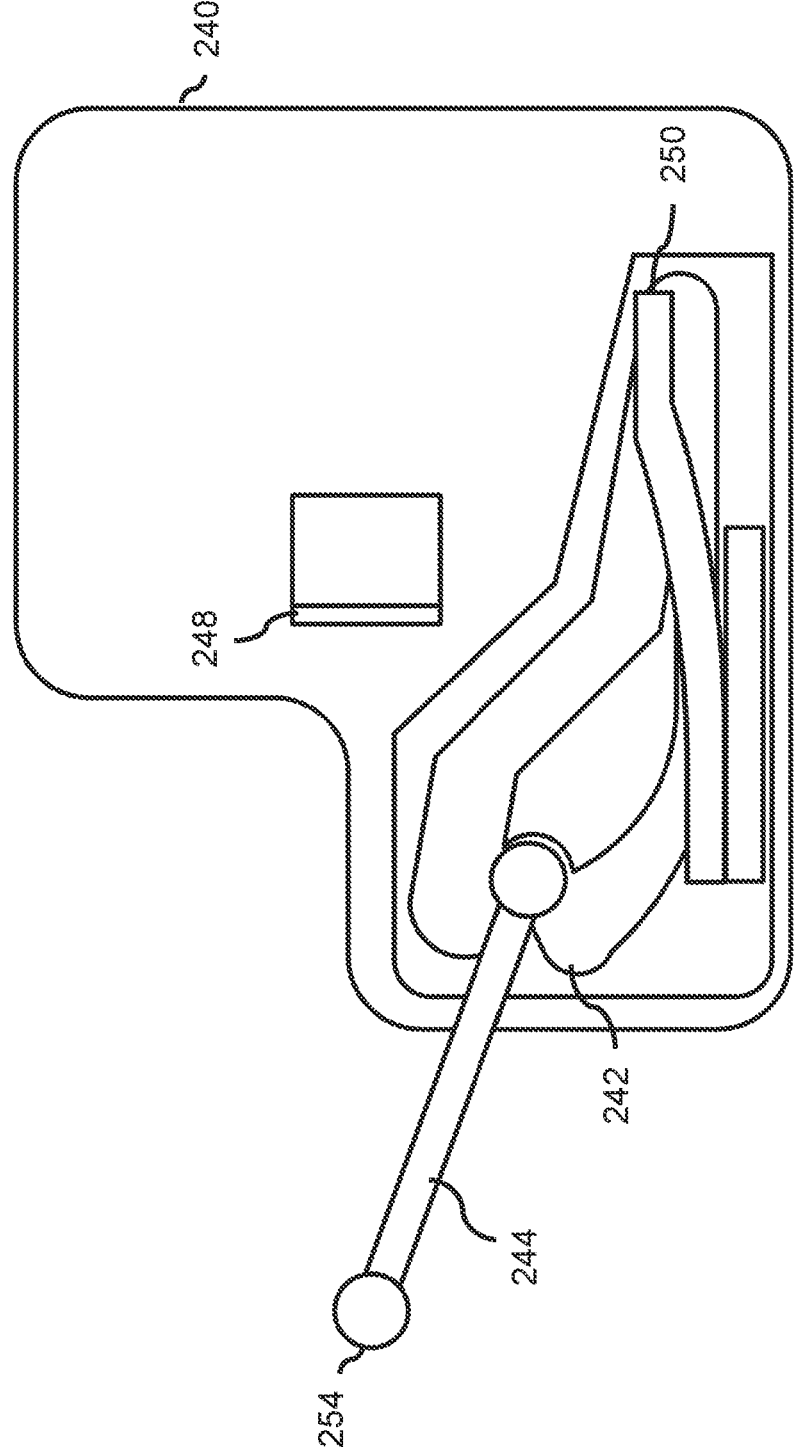
FIG. 2L depicts a partial side view of a breakover mechanism in a deployed position, in accordance with one or more embodiments of the present disclosure.
Figure 2M:
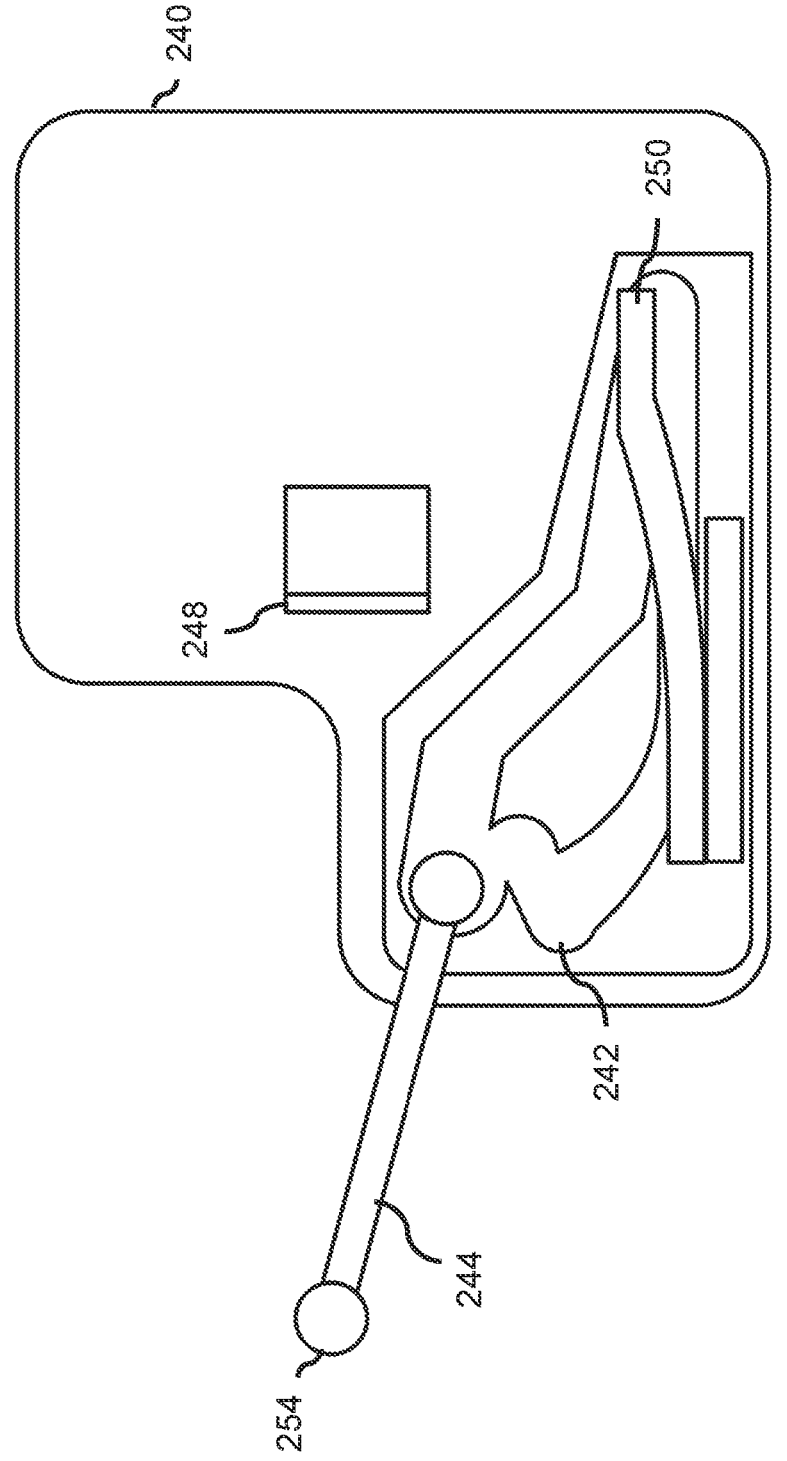
FIG. 2M depicts a partial side view of a breakover mechanism in a breakover position, in accordance with one or more embodiments of the present disclosure.

Referring now to FIGS. 2A-2N, the seat pan 106 is now described, in accordance with one or more embodiments of the present disclosure. The seat pan 106 includes one or more components, such as, but not limited to, a fixed assembly 202, driven assembly 204, linear actuator 206, controller 208, breakover mechanism 210, and the like.

The seat pan 106 includes the fixed assembly 202. The fixed assembly 202 is considered fixed in that the fixed assembly 202 is maintained at a fixed position within the aircraft 100, the seat group 101, the passenger seat 102, and the seat pan 106. The fixed assembly 202 is fixed by coupling to the legs 110. The fixed assembly 202 is then maintained at the fixed position while one or more other components of the seat pan 106 (e.g., the driven assembly 204) are translated relative to the fixed assembly 202. The fixed assembly 202 includes one or more components, such as, but not limited to, fixed upholstery 212, fixed flex pan(s) 214, fixed links 216, fixed crossbar 218, and the like. The fixed upholstery 212, fixed flex pan(s) 214, fixed links 216, and fixed crossbar 218 may be considered "fixed" in that each of the components are fixed with the fixed assembly 202.

The seat pan 106 also includes the driven assembly 204. The driven assembly 204 is considered driven in that the driven assembly 204 is not maintained at a fixed position within the aircraft 100, the seat group 101, the passenger seat 102, and the seat pan 106. The driven assembly 204 is configured to pivot relative to the fixed assembly 202. The driven assembly 204 includes one or more components, such as, but not limited to, driven upholstery 224, driven flex pan 226, driven links 228, driven crossbar 230, and the like. The driven upholstery 224, driven flex pan 226, driven links 228, and driven crossbar 230 may be considered "driven" in that each of the components are driven with the driven assembly 204.

The driven assembly 204 is pivoted to one or more positions relative to the fixed assembly 202. The driven assembly 204 is pivoted to a stowed position, a deployed position, and/or a breakover position. For example, the driven assembly 204 may be orthogonal to the fixed assembly 202 in the stowed position. The driven assembly 204 may then be pulled upwards to the deployed position. For example, the driven assembly 204 may be at an angle between 5 degrees to 20 degrees relative to the fixed assembly 202 in the deployed position. The fixed assembly 202 and the driven assembly 204 collectively act as a seat when the driven assembly 204 is in the deployed position. The breakover mechanism 210 retains the driven assembly 204 in the deployed position. The breakover mechanism 210 retains the driven assembly 204 in the deployed position until the driven assembly 204 is pivoted upwards. For example, the driven assembly 204 may be at an angle less than the deployed position when in the breakover position. For instance, the driven assembly 204 may be rotated 4 degrees upwards from the deployed position to the breakover position. After being rotated upwards from the deployed position to the breakover position, the breakover mechanism 210 is disengaged allowing the driven assembly 204 to return to the stowed position.

The fixed assembly 202 includes fixed upholstery 212. The driven assembly 204 includes the driven upholstery 224. The fixed upholstery 212 and the driven upholstery 224 may be shaped such that the fixed upholstery 212 and the driven upholstery 224 do not impede the motion of the driven assembly 204. The fixed upholstery 212 includes one or more components, such as, but not limited to, a fixed cushion 220 and a fixed dress cover 222. The driven upholstery 224 also includes one or more components, such as, but not limited to, a driven cushion 236 and a driven dress cover 238.

The fixed cushion 220 and the driven cushion 236 (collectively the cushions) may include a shape or contour. The contour of the cushions are designed to match the contour of a typical passenger. The cushions may remain in the shape through the life of the cushions. In this regard, the cushions may include a contour which is fixed. It is noted that the cushions may experience some plastic deformations while remaining fixed at the contour. For example, the cushions may experience plastic deformations due to age, heat, repeated elastic deformations, and the like.

The fixed dress cover 222 and the driven dress cover 238 (collectively the dress covers) may contribute to the aesthetics of the passenger seat 102. For example, the dress covers may include a color and/or pattern which contributes to the aesthetics. The color and pattern may be adjusted to achieve the desired aesthetic.

The dress covers may be configured to fit over at least a portion of the cushions. For example, the dress covers may be configured to wrap around or otherwise enclose the cushions. The dress covers may then act as a protective skin to the cushions. The dress covers may lie flat on the cushions. In this regard, the dress covers may conform to the cushions. The cushions may be at least partially covered or enclosed (e.g., contained within) by the dress covers. For example, the dress covers may wrap around one or more edges, side surfaces, and/or bottom surface of the cushions to secure the dress covers to the cushions. For instance, the cushions may be fully enclosed (e.g., contained within) by the dress covers. It is noted herein the wrap-around nature of the dress covers may assist in keeping the dress covers taut.

The fixed assembly 202 includes the fixed flex pan(s) 214. The driven assembly 204 includes the driven flex pan 226. The fixed flex pan(s) 214 and the driven flex pan 226 (collectively the flex pans) may also be referred to as a support, structural member, base structure, and the like. In some embodiments, the flex pans are fabricated from sheet metal, or the like.

The fixed upholstery 212 are disposed above and coupled to the fixed flex pans 214. The driven upholstery 224 are disposed above and coupled to the driven flex pan 226. The fixed flex pans 214 support the fixed upholstery 212. The driven flex pan 226 support the driven upholstery 224. The flex pans support the upholsteries by bearing a weight of and/or holding up the upholsteries. The flex pans provide sufficient support to an occupant seated on the upholsteries.

The fixed assembly 202 includes the fixed links 216. For example, the fixed assembly 202 includes a pair of the fixed links 216. The driven assembly 204 includes the driven links 228. For example, the driven assembly 204 includes a pair of the driven links 228. The driven links 228 and the fixed links 216 (collectively the links) are rigid members.

The pair of fixed links 216 are coupled to the pair of driven links 228 at a pair of revolute joints 252. A revolute joint may also be referred to as a pivot point, pivot joint, hinge joint, or the like. The revolute joints 252 constrains the motion of the fixed links 216 relative to the driven links 228. In particular, the driven links 228 are configured to rotate relative to the fixed links 216 about the revolute joints 252. The revolute joints 252 prevents translation of the fixed links 216 relative to the fixed links 216. Thus, the driven links 228 includes one degree-of-freedom relative to the fixed links 216 by the revolute joints 252. The revolute joints 252 includes a horizontal axis of rotation. In this regard, the driven links 228 rotates about the revolute joints 252 in the horizontal axis of rotation.

The fixed links 216 include a fore end and an aft end. The aft end of the pair of fixed links 216 includes the pair of revolute joints 252. The driven links 228 include a fore end and an aft end. The fore end of the pair of driven links 228 includes the pair of revolute joints 252. Thus, the aft end of the fixed links 216 are coupled to the fore end of the driven links 228 at the revolute joints 252. The driven links 228 may rotate relative to the fixed links 216 about the revolute joints 252 such that the driven links 228 is configured to move at least partially in an upward direction and forward direction, such as to a deployed position, and also move at least partially in a downward direction and aft direction, such as to a stowed position.

The fixed flex pans 214 extends between and couples the fixed links 216. The driven flex pan 226 extends between and couples the driven links 228. For example, the flex pans may be coupled to the links by a rivet, or the like.

The fixed assembly 202 includes the fixed crossbar 218. The fixed crossbar 218 extends between and couples the fixed links 216. For example, the fixed crossbar 218 extends between and couples the fixed links 216 at the fore end of the fixed links 216.

The driven assembly 204 includes the driven crossbar 230. The driven crossbar 230 extends between and couples the driven links 228. For example, the driven crossbar 230 extends between and couples the driven links 228 at the aft end of the driven links 228.

The seat pan 106 includes the breakover mechanism 210. The breakover mechanism 210 is coupled between the fixed assembly 202 and the driven assembly 204. The breakover mechanism 210 is configured to retain the driven assembly 204 at the stowed position. The breakover mechanism 210 is also configured to retain the driven assembly 204 at the deployed position. The breakover mechanism 210 includes one or more components, such as, but not limited to, a plate 240, cam 242, lock rod 244, cover 246, magnet 248, spring 250, and the like.

The breakover mechanism 210 includes the plate 240. The plate 240 is coupled to the fixed link 216. The plate 240 is coupled to the fixed link 216 between the fore end and the aft end of the fixed link 216. In some embodiments, the plate 240 is coupled to the fixed link 216 proximate to the fore end of the fixed link 216. The plate 240 extends downwards from the fixed link 216.

The breakover mechanism 210 includes the cover 246. The cover 246 is coupled to the plate 240. For example, the cover 246 is coupled to the plate 240 by one or more spacers. The plate 240 and the cover 246 are spaced to receive the driven link 228 when the driven assembly 204 is in the stowed position. The plate 240 and the cover 246 receive a first driven link of the pair of driven links 228 when the driven assembly is in the stowed position.

The breakover mechanism 210 includes the lock rod 244. The lock rod 244 is coupled to the driven link 228 by a revolute joint 254. The revolute joints 254 constrains the motion of the lock rod 244 relative to the driven links 228. In particular, the driven links 228 are configured to rotate relative to the fixed links 216 about the revolute joints 254. The revolute joints 254 prevents translation of the lock rod 244 relative to the driven links 228, and similarly to the driven assembly 204. Thus, the lock rod 244 includes one degree-of-freedom relative to the driven links 228 and to the driven assembly 204 by the revolute joint 254. The pair of revolute joints 252 and the revolute joint 254 share a common axis of rotation. The revolute joint 254 includes a horizontal axis of rotation. In this regard, the lock rod 244 rotates about the revolute joint 254 in the horizontal axis of rotation. The lock rod 244 include a fore end and an aft end. The fore end of the lock rod 244 is coupled to the driven links 228 by the revolute joint 254. The driven links 228 are coupled to the revolute joint 254 between the fore end and the aft end of the driven links 228.

The breakover mechanism 210 includes the cam 242. The cam 242 is defined by the plate 240 and the cover 246. For example, the plate 240 and the cover 246 include open grooves defining the cam 242. The cam 242 forms a guided path for the lock rod 244 to follow between the stowed position and the deployed position. The cam 242 defines one or more positions, including a stowed position 256, a deployed position 258, and a breakover position 260.

The lock rod 244 is also coupled to the cam 242. For example, the aft end of the lock rod 244 is coupled to the cam 242. For instance, the aft end of the lock rod 244 is a roller or pin disposed in the cam 242. The aft end of the lock rod 244 is coupled to and follows the cam 242. The lock rod 244 follows the cam 242 as the driven assembly 204 pivot about the pair of revolute joint 252. The cam 242 and the lock rod 244 define the path of the driven assembly 204 between the stowed position, the deployed position, and the breakover position. The aft end of the lock rod 244 is positioned at the stowed position 256 of the cam 242 when the driven assembly 204 is in the stowed position. The aft end of the lock rod 244 is positioned at the deployed position 258 of the cam 242 when the driven assembly 204 is in the deployed position. The aft end of the lock rod 244 is positioned at the breakover position 260 of the cam 242 when the driven assembly 204 is in the breakover position. The aft end of the lock rod 244 is rotated upwards from the deployed position 258 to the breakover position 260.

The breakover mechanism 210 includes the magnet 248. The magnet 248 is coupled to the plate 240. The magnet 248 projects outwards from the plate 240. The magnet 248 is disposed below the fixed links 216. The magnet 248 magnetically couples to the driven links 228 when the driven assembly 204 is in the stowed position. The magnet 248 then secures the driven assembly 204 in the stowed position by the magnetic coupling. The magnetic coupling must be overcome to drive the driven assembly 204 from the stowed position to the deployed position. In some embodiments, the magnet 248 magnetically couples to the driven links 228 between the revolute joints 252 and the revolute joint 254. The magnet 248 may also attenuate vibrations of the driven assembly 204 when the magnet 248 is magnetically coupled to the driven links 228. Attenuating the vibrations may then prevent the driven assembly 204 from rattling when the passenger seat 102 is not in use during flight.

The breakover mechanism 210 includes the spring 250. The spring 250 may include a leaf spring, or the like. The spring 250 is coupled between the plate 240 and the cover 246. The spring 250 is disposed in the path of the lock rod 244 as the lock rod 244 follows the cam 242. The lock rod 244 compresses the spring 250 when the driven assembly 204 is in the stowed position. The spring 250 exerts a spring force against the lock rod 244 when the driven assembly 204 is in the stowed position. The spring force against the lock rod 244 may assist the lock rod 244 during deployment of the driven assembly 204 to the deployed position. For example, the spring 250 may reduce a forced required to translate the driven assembly 204 from the stowed position to the deployed position. The spring 250 may also prevent lockup of the lock rod 244 while translating the driven assembly 204 to the stowed position.

In some embodiments, the driven assembly 204 is manually driven between the stowed position, deployed position, and/or the breakover position. For example, the occupant may grab the driven assembly 204 and lift the driven assembly 204 pivot the driven assembly 204 between the various positions.

In some embodiments, the driven assembly 204 is driven between the stowed position, deployed position, and/or the breakover position by the linear actuator 206. The seat pan 106 includes the linear actuator 206. The linear actuator 206 may include any suitable linear actuator, such as, but not limited to, an electrically-controlled linear actuator. The linear actuator 206 is coupled between the fixed assembly 202 and the driven assembly 204. A first end of the linear actuator 206 is coupled to the fixed assembly 202 and a second end of the linear actuator 206 is coupled to the driven assembly 204. For example, the first end of the linear actuator 206 may be coupled to one or more of the fixed upholstery 212, flex pans 214, links 216, crossbar 218, or the like. By way of another example, the second end of the linear actuator 206 may be coupled to one or more of the driven upholstery 224, driven flex pans 226, driven links 228, driven crossbar 230, or the like. In some embodiments, the linear actuator 206 is disposed below the fixed assembly 202.

The linear actuator 206 is configured to extend and retract. Extension and retraction of the linear actuator 206 causes the driven assembly 204 to pivot relative to the fixed assembly 202. Extension of the linear actuator 206 causes the driven assembly 204 to translate to the deployed position. Retraction of the linear actuator 206 causes the driven assembly 204 retracted position. The linear actuator 206 is configured to pivot the driven assembly 204 relative to the fixed assembly 202 about the pair of revolute joints 252 between the stowed position, the deployed position, and the break-over position. Thus, the linear actuator 206 is configured to deploy and stow the driven assembly 204. For example, the linear actuator 206 may deploy the driven assembly 204 by causing the driven assembly 204 to pivot to the deployed position. By way of another example, the linear actuator 206 may stow the driven assembly 204 by causing the driven assembly 204 to pivot to the stowed position.

In some embodiments, the force provided by the linear actuator 206 on the driven assembly 204 assembly is variable. The force provided by the linear actuator 206 on the driven assembly 204 assembly may be variable based on the electrical power received by the linear actuator 206. For example, the force is dependent on voltage and current.

In some embodiments, the linear actuator 206 is encapsulated. The linear actuator 206 may be encapsulated by one or more components of the seat pan 106, the passenger seat 102, and/or the seat group 101. The linear actuator 206 is encapsulated to ensure there are no pinch points.

The breakover mechanism 210 may work in combination with the linear actuator 206 to allow the linear actuator 206 to power off while maintaining the driven assembly 204 in the deployed and stowed positions. When the driven assembly 204 is to be deployed, the linear actuator 206 may deploy the driven assembly 204 to the deployed position. The breakover mechanism 210 may retain the driven assembly 204 in the deployed position. The linear actuator 206 may then be powered off, with the driven assembly 204 maintained in the deployed position. When the driven assembly 204 is to be stowed, the linear actuator 206 may stow the driven assembly 204 to the stowed position. The breakover mechanism 210 may retain the driven assembly 204 in the stowed position. The linear actuator 206 may then be powered off, with the driven assembly 204 maintained in the stowed position. The breakover mechanism 210 may save power for the linear actuator 206 by retaining the driven assembly 204 in the stowed and deployed positions.

In some embodiments, the seat pan 106 includes the controller 208. The controller 208 is configured to cause linear actuator 206 to pivot the driven assembly 204 relative to the fixed assembly 202 about the pair of revolute joints 252 between the stowed position, the deployed position, and the breakover position. Thus, the controller 208 is configured to cause the linear actuator 206 to deploy and/or stow the driven assembly 204. The controller 208 may cause the linear actuator 206 to deploy and/or stow the driven assembly 204 by sending one or more signals to the linear actuator 206. For example, the controller 208 may send a Pulse-width modulation (PWM) signal, or the like, to the linear actuator 206. In some embodiments, the controller 208 may cause the linear actuator 206 to stow the driven assembly 204 in response to receiving an emergency landing signal. For example, the controller may receive the emergency landing signal from one or more networks of the aircraft 100.

In some embodiments, the fixed dress cover 222 includes a pressure mapping sensor 232. For example, the fixed dress cover 222 may include fabric embroidered with the pressure mapping sensor 232. The pressure mapping sensor 232 may also be referred to as a textile pressure mapping sensor. The pressure mapping sensor 232 includes an array of pressure sensors. The array of pressure sensors are each configured to generate a pressure value. For example, a resistance value of the array of pressure sensors changes due to pressure. The changes in the resistance values then indicate the pressure values. The array of pressure values may then correspond to a pressure map 234. Thus, the pressure mapping sensor 232 is configured to generate the pressure map 234. The pressure mapping sensor 232 communicates the pressure map 234 to the controller 208.

The pressure map 234 is described, in accordance with one or more embodiments of the present disclosure. The pressure map 234 may also be referred to as a pressure distribution map, pressure distribution charge, or the like. The pressure map 234 includes a matrix of points. The matrix of points correspond to locations on the pressure mapping sensor 232. The matrix of points each include a pressure value. The pressure values corresponding to the pressure at the correspond to locations on the pressure mapping sensor 232. The pressure value may be digital data. For example, the pressure value may be digital data with a value from 0 to 255 (e.g., a byte of data). Thus, the pressure map 234 depicts a pressure distribution across an area of the fixed upholstery 212.

In some embodiments, the controller 208 receives the pressure map 234 from the pressure mapping sensor 231. The controller 208 causes the linear actuator 206 to pivot the driven assembly relative to the fixed assembly based on the pressure map 234. The controller 208 may execute one or more control schemes for causing the linear actuator 206 to deploy and/or stow the driven assembly 204 based on the pressure map 234.

In some embodiments, the controller 208 is configured to detect weight on the fixed assembly 202 based on the pressure map 234. The weight may indicate an occupant is exerting weight (i.e., sitting or standing) on the fixed assembly 202. The controller 208 is configured to cause the linear actuator 206 to deploy the driven assembly 204 in response to detecting the weight on the fixed assembly 202. In some embodiments, the is configured to cause the linear actuator 206 to deploy the driven assembly 204 in response to detecting the weight on the fixed assembly 202 exceeds a weight threshold. The controller 208 may also detect there is no weight on the fixed assembly 202. The no weight indicates an occupant is no longer exerting weight (i.e., sitting or standing) on the fixed assembly 202. The controller 208 is configured to cause the linear actuator 206 to stow the driven assembly 204 in response to detecting no weight on the fixed assembly 202. Thus, once the occupant leaves the passenger seat 102, the controller 208, via pressure mapping sensor 231, senses the occupant leave. The controller 208 then causes the linear actuator 206 to stow the driven assembly 204.

In some embodiments, the controller 208 is configured to determine the passenger is sitting on the fixed assembly 202. The controller 208 is programmed not to cause the actuator to actuate the driven assembly 204 until the controller 208 determines the occupant is sitting on the fixed assembly 202. The controller 208 causes the linear actuator 206 to pivot the driven assembly 204 relative to the fixed assembly 202 in response to determining the passenger is sitting on the fixed assembly 202. In some embodiments, the controller 208 is configured to perform pattern recognition on the weight per unit area in the pressure map 234 to determine the passenger is sitting. The pattern recognition may be based on a weight per unit area in the pressure map 234. For example, the controller 208 may recognize patterns corresponding to the ischium of the pelvis and/or the femur.

In some embodiments, the controller 208 is configured to detect a weight on the seat pan 106 based on the pressure map 234. The weight may correspond to a passenger sitting on the seat pan 106. For example, the controller 208 may determine the size of the passenger is between a 5th percentile to a 95th percentile. The controller 208 may supply power to the actuator 206 based on the size of the weight detected. The actuator 206 may be controlled to provide the minimal actuation force to deploy the driven assembly 204. Less weight on the seat pan 106 may require reduced actuation force of the driven assembly 204. Similarly, more weight on the seat pan 106 may require increased actuation force. Controlling the power supplied to the actuator 206 based on the size of the weight may be desirable to reduce the power consumption of the actuator 206 when less weight is detected (i.e., for smaller passengers).

In some embodiments, the controller 208 is configured to detect an occupant is standing on the seat pan 106 based on the pressure map 234. The controller 208 is programmed not to cause the actuator to actuate the driven assembly 204 when the controller 208 detects an occupant is standing on the seat pan 106. The driven assembly 204 then remains in the stowed position, even when the occupant is standing on the fixed assembly 202.

In some embodiments, the magnet 248 is an electromagnet. The electromagnet may include a holding strength. For example, the electromagnet may include a holding strength of 300 pounds, although this is not intended to be limiting. The electromagnet may be engaged to magnetically couple to the driven link 228, thereby holding the driven assembly 204 in the stowed position. The electromagnet may be disengaged to release the magnetic coupling to the driven link 228, thereby releasing the driven assembly 204 from the stowed position.

In some embodiments, the controller 208 may be configured to engage and/or disengage the electromagnet. For example, the controller 208 may disengage the electromagnet in response to receiving a user input. The user input may be received from a button or the like. By way of another example, the controller 208 may disengage the electromagnet in response to determining the occupant is sitting on the seat pan 106.

Figure 3:
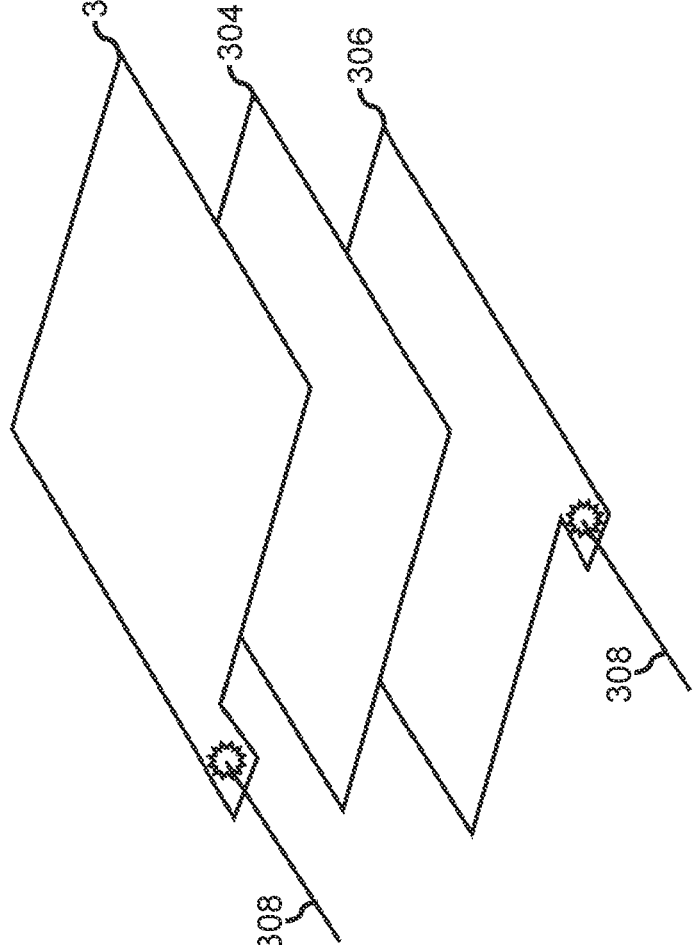
FIG. 3 depicts an exploded view of a pressure mapping sensor, in accordance with one or more embodiments of the present disclosure.

Referring now to FIG. 3, the pressure mapping sensor 232 is described, in accordance with one or more embodiments of the present disclosure. In some embodiments, the pressure mapping sensor 232 is a three-layer structure forming a capacitance or resistance with a pressure-sensing non-conducting dielectric medium. The pressure mapping sensor 232 includes layer 302, layer 304, and layer 306.

The layer 302 and the layer 306 may be considered electrode layers and/or outer layers. The layer 302 and layer 306 are parallel electrodes. The layer 302 and the layer 306 each include a metallic fiber and/or conductive threads. The metallic fiber and/or conductive threads are woven into a non-conductive fabric. Conductive threads 308 extend from each of the layer 302 and the layer 306. The conductive threads may include a silver coated yarn, or the like. Every cross point of the layer 302 and the layer 306 is a pressure sensitive point. The spatial granularity of the pressure sensitive point is determined by the pitch distance of the parallel electrodes.

The layer 304 may be considered a force-sensitive layer and/or a middle layer. The layer 304 is sandwiched between the layer 302 and the layer 306. The layer 304 includes a carbonated polymer fabric.

Figure 4:
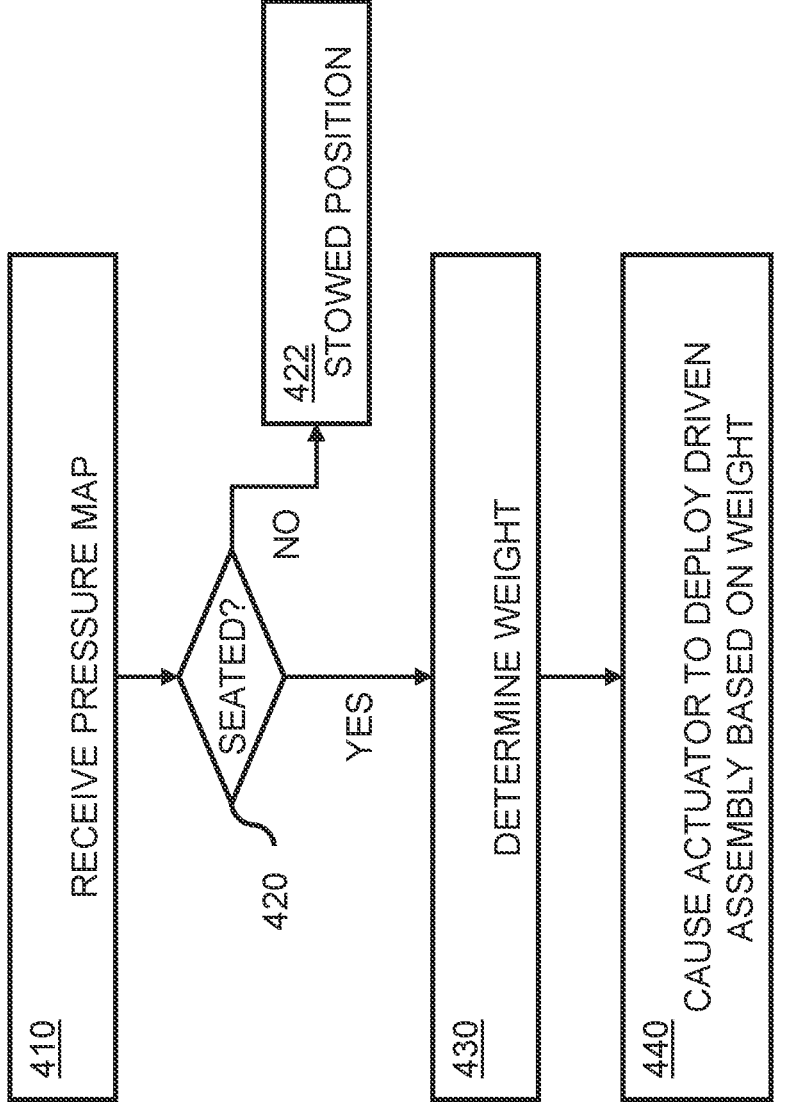
FIG. 4 depicts a flow diagram of a method, in accordance with one or more embodiments of the present disclosure.

Referring now to FIG. 4, a method is described in accordance with one or more embodiments of the present disclosure. The embodiments and enabling technologies described previously herein in the context of the aircraft 100, seat group 101, passenger seat 102, seat pan 106, and controller 208 should be interpreted to extend to method 400. For example, the controller 208 may perform any of the various steps of the method.

In a step 410, the controller 208 receives the pressure map 234 from the pressure mapping sensor 231.

In a step 420, the controller 208 determines whether a passenger is seated on the seat pan 106 based on the pressure map 234.

In a step 422, the controller 208 determines the passenger is not seated on the seat pan 106 and causes the driven assembly 204 to remain in the stowed position.

In a step 430, the controller 208 determines the weight of the passenger based on the pressure map 234 in response to determining the passenger is seated on the seat pan.

In a step 440, the controller 208 causes the actuator 206 to deploy the driven assembly 204 based on the weight of the passenger. If the weight of the passenger is small, the force of the actuator 206 is reduced. If the weight of the passenger is large, the force of the actuator 206 is increased.

Figure 5:
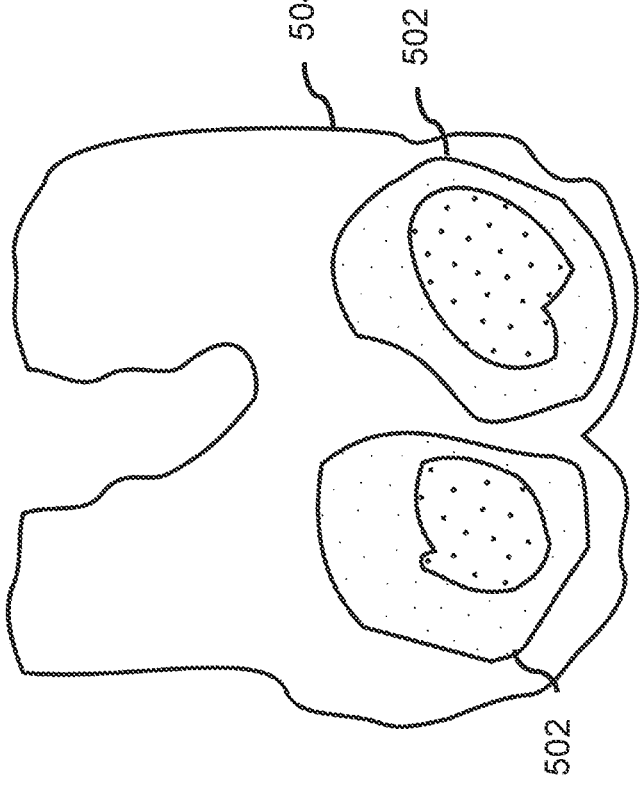
FIG. 5 depicts an example of a pressure map, in accordance with one or more embodiments of the present disclosure.

Referring now to FIG. 5, an example of the pressure map 234 is described, in accordance with one or more embodiments of the present disclosure. The pressure map 234 includes a pair of high-pressure regions 502. The pair of high-pressure regions 502 are disposed adjacent to each other. The pair of high-pressure regions 502 correspond to a pair of ischium of the pelvis. The pressure map 234 includes a low-pressure region 504. The low-pressure region 504 extend from each of the pair of high-pressure regions 502. The low-pressure region 504 correspond to a pair of femurs which are coupled to the pelvis. The controller 208 may perform pattern recognition on the pressure map 234 to identify the pair of high-pressure regions 502 and the low-pressure regions 504 as corresponding to the pelvis and the pair of femurs, thereby determining a passenger is sitting on the fixed assembly 202.

Referring now to FIGS. 6A-7B, the seat pan 106 is described, in accordance with one or more embodiments of the present disclosure. In some embodiments, the seat pan 106 is a telescopic seat pan. The seat pan 106 may include one or more components, such as, but not limited to, the fixed assembly 202, the fixed upholstery 212, the fixed flex pans 214, the fixed links 216, the fixed crossbar 218, the driven upholstery 224, the driven assembly 204, the driven upholstery 224, the driven flex pans 226, the driven links, the driven crossbar 230, the actuator 206, the controller 208, and the like. The seat pan 106 may not include the breakover mechanism 210. Instead, the driven assembly 204 and the fixed assembly 202 are coupled by a prismatic joint 602.

The seat pan 106 includes the prismatic joint 602. The prismatic joint 602 may also be referred to as a slider, a sliding joint, or the like. The prismatic joint 602 is coupled between the driven assembly 204 and the fixed assembly 202. For example, the prismatic joint 602 is coupled to a side surface of each of the driven assembly 204 and the fixed assembly 202. The driven assembly 204 is configured to translate relative to the fixed assembly 202 by the prismatic joint 602. For example, the prismatic joint 602 may permit rectilinear translation or the like. The prismatic joint 602 constrains the driven assembly 204 to one degree-of-freedom relative to the fixed assembly 202. The one degree-of-freedom is translation along the prismatic joint 602. The driven assembly 204 is prevented from translating in another axis and from rotating. The prismatic joint 602 also supports the driven assembly 204.

Figure 6A:
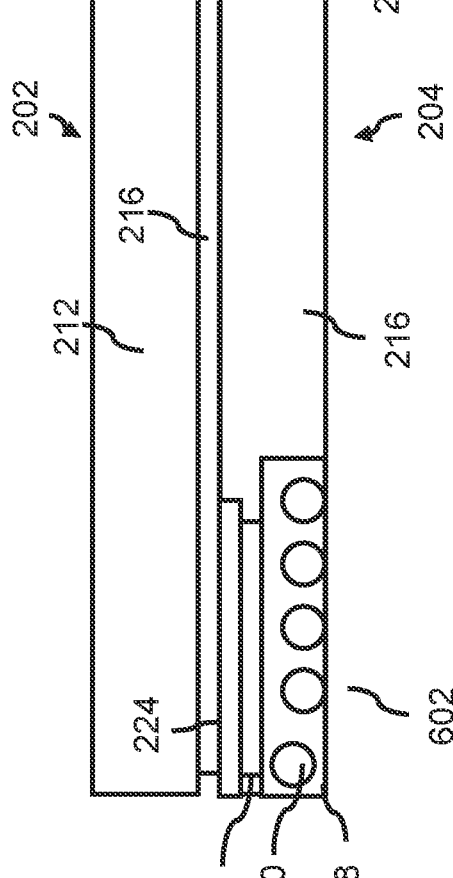
FIG. 6A depicts a side view of a seat pan with a driven assembly in a stowed position and with a deflated cushion, in accordance with one or more embodiments of the present disclosure.
Figure 6B:
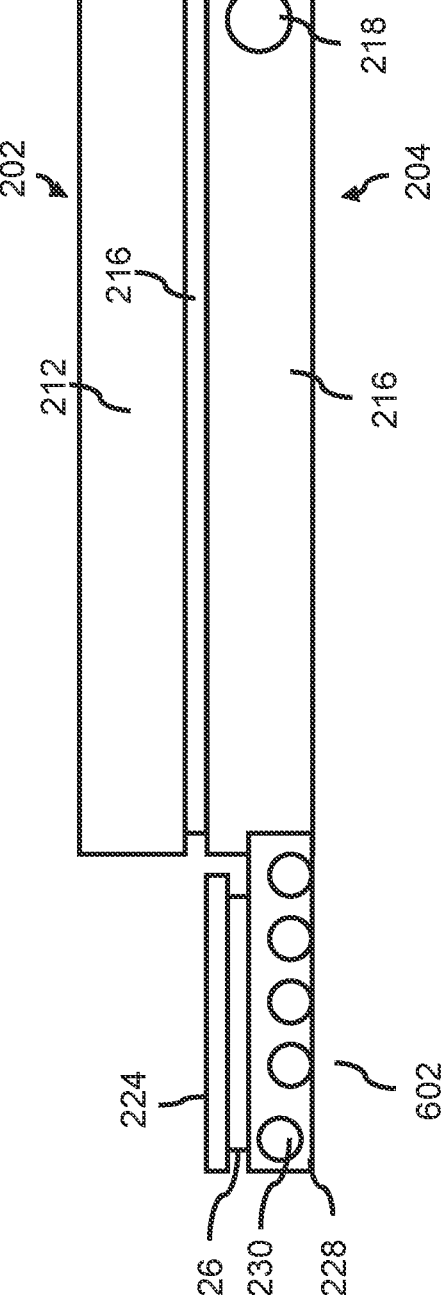
FIG. 6B depicts a side view of a seat pan with a driven assembly in a deployed position and with a deflated cushion, in accordance with one or more embodiments of the present disclosure.
Figure 6C:
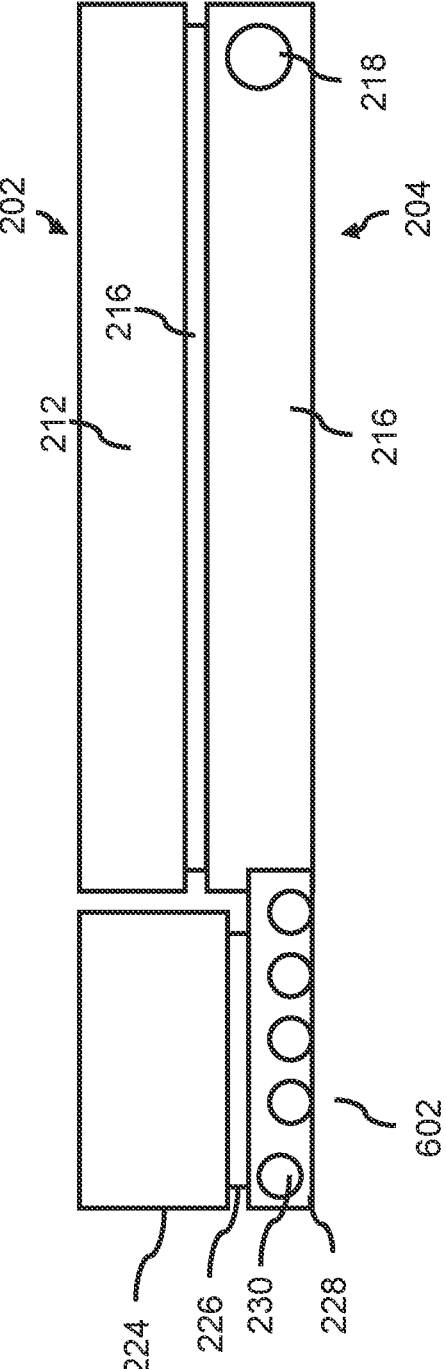
FIG. 6C depicts a side view of a seat pan with a driven assembly in a deployed position and with an inflated cushion, in accordance with one or more embodiments of the present disclosure.

Referring in particular to FIGS. 6A-6C, the driven upholstery 224 may include the driven cushion 236. The driven cushion 236 may be inflatable. For example, the driven cushion 236 may be inflatable with a fluid. The driven cushion 236 is deflated when the driven assembly 204 is in the stowed position. The driven cushion 236 is deflated such that the driven upholstery 224 is offset from the fixed upholstery 212. The driven cushion 236 may be inflated when the driven assembly 204 is in the deployed position. The driven cushion 236 may be inflated such that the driven upholstery 224 is flush with the fixed upholstery 212.

Figure 7A:
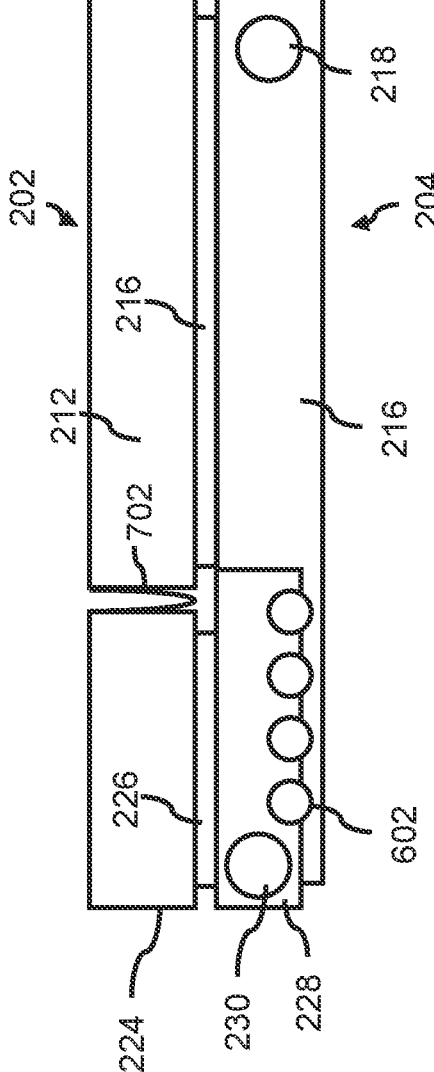
FIG. 7A depicts a side view of a seat pan with a driven assembly in a stowed position, in accordance with one or more embodiments of the present disclosure.
Figure 7B:
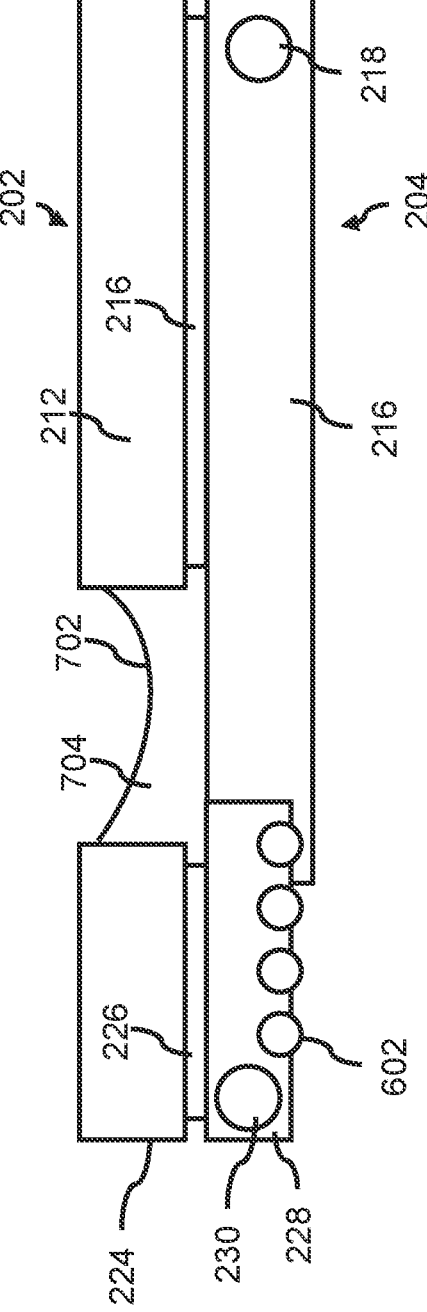
FIG. 7B depicts a side view of a seat pan with a driven assembly in a deployed position with a flexible fabric covering a gap, in accordance with one or more embodiments of the present disclosure.

Referring in particular to FIGS. 7A-7B, the driven upholstery 224 may include the driven cushion 236. The driven cushion 236 may not be inflatable. The driven upholstery 224 may be flush with the fixed upholstery 212. The driven upholstery 224 is flush with the fixed upholstery 212 when the driven assembly 204 is in each of the stowed position and the deployed position. The seat pan 106 may also include a flexible fabric 702. The flexible fabric 702 is coupled between the fixed upholstery 212 and the driven upholstery 224. The flexible fabric 702 covers a gap 704 formed between the fixed upholstery 212 and the driven upholstery 224 when the driven assembly 204 is translated relative to the fixed assembly 202. For example, the gap 704 is formed between the fixed upholstery 212 and the driven upholstery 224 when the driven assembly 204 is translated relative to the deployed position.

Referring generally again to FIGS. 1A-7B. It is noted that where the passenger seat 102 is installed within the aircraft 100, the passenger seat 102 may be configured in accordance with aviation guidelines and/or standards put forth by, but not limited to: the Federal Aviation Administration (FAA), the European Aviation Safety Agency (EASA), or any other flight certification agency or organization; the American National Standards Institute (ANSI) or any other standards setting organization or company; and the like.

In embodiments, the cushions may include foam. The foam may include a material, such as, but not limited to a polyurethane (PU) foam. The foam may be cut and bonded into shape, molded into shape, and the like. In another embodiment, where there are multiple layers of foam, the multiple layers may be coupled together. For example, the multiple layers may be coupled with an adhesive, with fasteners, or the like. In embodiments where there are multiple layers of foam, the multiple layers may be fabricated from foam having the same or different densities. For example, the foam may be stacked, with the first layer on the bottom being constructed from a highest-density foam on the bottom and the succeeding layers being constructed of successively less dense foam. Although the cushions are described as being foam, this is not intended as a limitation of the present disclosure.

In embodiments, the cushions may include a fire blocker. The cushions may include one or more layers of the fire blocker. The fire blocker may include a flame-retardant material property. Flame retardant may refer a property of resisting degradation when subject to a flame. The layers of the fire blocker may be provided above, below, and/or interspersed with the layers of the foam.

In embodiments, the cushions may include a stiffness. The stiffness of the cushions may be defined by the foam and/or the fire blocker layers. The stiffness may be measured in indentation load deflection (ILD). Indentation load deflection (ILD) may indicate a number of pounds of pressure needed to indent a cushion by 25%. Indentation load deflection (ILD) may also be referred to as indentation force deflection (IFD) or as a compression profile. For example, the cushions may include an Indentation Load Deflection (ILD) of between 20 and 80 pounds, although this is not intended to be limiting.

In some embodiments, the controllers may adjust the stiffness of the cushions. In some embodiments, the controllers may perform intelligent cushion modulation. The controllers may adjust the stiffness based on the pressure maps. The controllers may adjust the stiffness to achieve maximum comfort for the occupant.

In another embodiment, the dress covers is manufactured from one or more sections. In general, the dress covers may be fabricated from 1, 2 . . . up to an N number of sections. Where there are multiple sections, each section has a section top surface length that forms a percentage of a cover top surface length of the dress covers. Where there are multiple sections, adjacent sections may be joined together. For example, the adjacent sections may be joined together via sewing, a fabric adhesive, or the like. For instance, adjacent sections may be joined together at one or more seams. Although seams are illustrated, it is noted herein the seams are shown only for purposes of clarity and that the seams may be hidden on the dress covers (e.g., non-accessible when the dress covers are installed on the cushions) for purposes of preventing access to the joining location, cleanliness of design, meeting aviation guidelines and/or standards, or the like.

In another embodiment, the one or more sections of the dress covers may be fabricated from a same type and/or pattern of material or a different type and/or pattern of material. For example, at least some of the sections of the dress covers may be fabricated from different types of material. By way of another example, all sections of the dress covers may be fabricated from a different type and/or pattern of material. By way of another example, all sections of the dress covers may be fabricated from a same type and/or pattern of material.

In embodiments, the dress covers may compress the cushions. The cushions may be pre-compressed and then wrapped with the dress covers. The dress covers may then compress the cushions by flattening, squeezing, and/or pressing downwards on the cushions. The compression of the cushions may increase the density of the foam in the cushions. The pre-compressed state of the cushions may also increase the stiffness of the cushions.

In some embodiments, the controller may use the pressure map to identify whether the cushion has reached a permanent failure. For example, the controller may use the pressure map to identify whether the cushion has exceeded a maximum pressure, a maximum number of loading cycles, or the like. The controller may send a signal to one or more networks of the aircraft in response to detecting the cushion has reached a permanent failure.

Although much of the present disclosure is directed to the passenger seat 102 being installed within the aircraft 100 or aircraft cabin, it is noted herein the passenger seat 102 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

In embodiments, the controller include memory. A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For instance, the program instructions may cause the processors to adjust the voltage differential.

In embodiments, the controller includes one or more processors. The processors may include any processing unit known in the art. For example, the processors may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A seat pan comprising:
a fixed assembly; wherein the fixed assembly comprises:
a pair of fixed links;
a fixed flex pan; wherein the fixed flex pan extends between and couples the pair of fixed links; and
a fixed upholstery; wherein the fixed upholstery is disposed above and coupled to the fixed flex pan;
a driven assembly; wherein the driven assembly comprises:
a pair of driven links; wherein the pair of fixed links are coupled to the pair of driven links at a pair of revolute joints; wherein the driven assembly is configured to pivot relative to the fixed assembly about the pair of revolute joints between a stowed position, a deployed position, and a breakover position;
a driven flex pan; wherein the driven flex pan extends between and couples the pair of driven links; and
a driven upholstery; wherein the driven upholstery is disposed above and coupled to the driven flex pan; and
a breakover mechanism; wherein the breakover mechanism is coupled between the driven assembly and the fixed assembly; wherein the breakover mechanism is configured to retain the driven assembly at the stowed position and at the deployed position, wherein the breakover mechanism comprises:
a plate; wherein the plate is coupled to the pair of fixed links;
a cover; wherein the cover is coupled to the plate; wherein the plate and the cover are configured to receive a first driven link of the pair of driven links when the driven assembly is in the stowed position; and
a lock rod; wherein a fore end of the lock rod is coupled to the first driven link by an additional revolute joint; wherein the pair of revolute joints and the additional revolute joint share a common axis of rotation; wherein the plate and the cover define a cam; wherein an aft end of the lock rod follows the cam.

2. The seat pan of claim 1, wherein the cam and the lock rod define a path of the driven assembly between the stowed position, the deployed position, and the breakover position.

3. The seat pan of claim 1, wherein the breakover mechanism comprises a spring; wherein the spring is coupled between the plate and the cover; wherein the lock rod compresses the spring when the driven assembly is in the stowed position.

4. The seat pan of claim 1, wherein the breakover mechanism comprises a magnet; wherein the magnet is coupled to the plate; wherein the magnet magnetically couples to the first driven link when the driven assembly is in the stowed position.

5. The seat pan of claim 4, wherein the magnet is an electromagnet.

6. The seat pan of claim 1, comprising a linear actuator; wherein the linear actuator is coupled between the fixed assembly and the driven assembly; wherein the linear actuator is configured to pivot the driven assembly relative to the fixed assembly about the pair of revolute joints between the stowed position, the deployed position, and the breakover position.

7. The seat pan of claim 6, comprising a controller; wherein the controller is configured to cause the linear actuator to pivot the driven assembly relative to the fixed assembly.

8. The seat pan of claim 7, wherein the fixed upholstery comprises a fixed dress cover and a fixed cushion; wherein the fixed dress cover comprises a pressure mapping sensor; wherein the pressure mapping sensor is configured to generate a pressure map; wherein the controller is configured to receive the pressure map from the pressure mapping sensor; wherein the controller is configured to cause the linear actuator to pivot the driven assembly relative to the fixed assembly based on the pressure map.

9. The seat pan of claim 8, wherein the controller is configured to determine a passenger is sitting on the fixed assembly based on the pressure map; wherein the controller causes the linear actuator to pivot the driven assembly relative to the fixed assembly in response to determining the passenger is sitting on the fixed assembly.

10. The seat pan of claim 1, wherein the fixed assembly comprises a fixed crossbar; wherein the pair of fixed links comprise a fore end and an aft end; wherein the fixed crossbar extends between and couples the pair of fixed links at the fore end of the pair of the fixed links; wherein the aft end of the pair of fixed links includes the pair of revolute joints.

11. The seat pan of claim 1, wherein the driven assembly comprises a driven crossbar; wherein the pair of driven links comprise a fore end and an aft end; wherein the driven crossbar extends between and couples the pair of driven links at the aft end of the pair of the driven links; wherein the fore end of the pair of driven links includes the pair of revolute joints.

12. A seat group comprising:
a plurality of passenger seats, wherein each of the plurality of passenger seats comprise:
a seat pan comprising:
a fixed assembly; wherein the fixed assembly comprises:
a pair of fixed links;

a fixed flex pan; wherein the fixed flex pan extends between and couples the pair of fixed links; and
a fixed upholstery; wherein the fixed upholstery is disposed above and coupled to the fixed flex pan;
a driven assembly; wherein the driven assembly comprises:
a pair of driven links; wherein the pair of fixed links are coupled to the pair of driven links at a pair of revolute joints; wherein the driven assembly is configured to pivot relative to the fixed assembly about the pair of revolute joints between a stowed position, a deployed position, and a breakover position;
a driven flex pan; wherein the driven flex pan extends between and couples the pair of driven links; and
a driven upholstery; wherein the driven upholstery is disposed above and coupled to the driven flex pan; and
a breakover mechanism; wherein the breakover mechanism is coupled between the driven assembly and the fixed assembly; wherein the breakover mechanism is configured to retain the driven assembly at the stowed position and at the deployed position, wherein the breakover mechanism comprises:
a plate: wherein the plate is coupled to the pair of fixed links;
a cover; wherein the cover is coupled to the plate; wherein the plate and the cover are configured to receive a first driven link of the pair of driven links when the driven assembly is in the stowed position; and
a lock rod; wherein a fore end of the lock rod is coupled to the first driven link by an additional revolute joint; wherein the pair of revolute joints and the additional revolute joint share a common axis of rotation;
wherein the plate and the cover define a cam; wherein an aft end of the lock rod follows the cam.

* * * * *